United States Patent
Brant et al.

(10) Patent No.: US 8,815,436 B2
(45) Date of Patent: Aug. 26, 2014

(54) MICROPOROUS MEMBRANE, METHODS FOR MAKING SUCH FILM, AND THE USE OF SUCH FILM AS BATTERY SEPARATOR FILM

(75) Inventors: Patrick Brant, Seabrook, TX (US); Derek W. Thurman, Houston, TX (US); Daniel P. Cherney, Hampton, NJ (US)

(73) Assignee: Toray Battery Separator Film Co., Ltd. (JP)

( * ) Notice: Subject to any disclaimer, the term of this patent is extended or adjusted under 35 U.S.C. 154(b) by 593 days.

(21) Appl. No.: 13/131,302

(22) PCT Filed: Nov. 23, 2009

(86) PCT No.: PCT/US2009/065560
§ 371 (c)(1),
(2), (4) Date: May 26, 2011

(87) PCT Pub. No.: WO2010/062856
PCT Pub. Date: Jun. 3, 2010

(65) Prior Publication Data
US 2011/0236745 A1    Sep. 29, 2011

Related U.S. Application Data

(60) Provisional application No. 61/118,104, filed on Nov. 26, 2008.

(30) Foreign Application Priority Data

Jan. 26, 2009 (EP) .................................... 09151316

(51) Int. Cl.
| | | |
|---|---|---|
| H01M 2/16 | (2006.01) | |
| H01M 2/18 | (2006.01) | |
| B05D 5/12 | (2006.01) | |
| B01D 71/44 | (2006.01) | |
| B01D 71/76 | (2006.01) | |
| C08G 61/02 | (2006.01) | |

(52) U.S. Cl.
CPC ........ *B01D 71/44* (2013.01); *C08G 2261/3424* (2013.01); *B01D 71/76* (2013.01); *C08G 61/025* (2013.01)
USPC ............................. 429/145; 429/249; 427/58

(58) Field of Classification Search
USPC .................................... 429/145, 249; 427/58
See application file for complete search history.

(56) References Cited

U.S. PATENT DOCUMENTS 3,830,733 A * 8/1974 Spivak et al. ................. 210/646
4,681,750 A   7/1987 Johnson et al.
(Continued)

FOREIGN PATENT DOCUMENTS

EP  0 286 263 A1  10/1988
EP  0 286 264 A2  10/1988
(Continued)

OTHER PUBLICATIONS

Senkevich, J.J. et al., "Thermomechanical Properties of Parylene X, a Room-Temperature Chemical Vapor Depositable Crosslinkable Polymer," *Chemical Vapor Deposition*, 2007, vol. 13, pp. 55-59.
(Continued)

*Primary Examiner* — Karie O'Neill Apicella
(74) *Attorney, Agent, or Firm* — DLA Piper LLP (US)

(57) ABSTRACT

Embodiments of the present invention generally relate to microporous membrane, methods for making microporous membrane, and the use of microporous membrane as battery separator film. More particularly, the invention relates to a microporous polymeric membrane including a paraxylylene polymer or copolymer, particularly in combination with a polymeric microporous membrane. The paraxylylene polymer or copolymer can be formed on or laminated to the microporous polymeric membrane.

25 Claims, 3 Drawing Sheets

(56) References Cited

U.S. PATENT DOCUMENTS

| | | | |
|---|---|---|---|
| 5,302,767 | A | 4/1994 | Galley et al. |
| 5,538,758 | A | 7/1996 | Beach et al. |
| 5,605,569 | A | 2/1997 | Boyer et al. |
| 5,841,005 | A | 11/1998 | Dolbier, Jr. et al. |
| 5,922,298 | A | 7/1999 | Boyer et al. |
| 5,935,543 | A | 8/1999 | Boyer et al. |
| 6,123,993 | A | 9/2000 | Xu et al. |
| 2006/0129192 | A1* | 6/2006 | Greatbatch et al. ............ 607/5 |
| 2007/0099019 | A1* | 5/2007 | Hanefeld et al. ............ 428/548 |
| 2007/0238017 | A1 | 10/2007 | Call et al. |
| 2008/0057388 | A1 | 3/2008 | Kono et al. |
| 2008/0057389 | A1* | 3/2008 | Kono et al. ............ 429/144 |
| 2009/0263641 | A1 | 10/2009 | Martin, III et al. |

FOREIGN PATENT DOCUMENTS

| | | |
|---|---|---|
| EP | 0 286 265 A1 | 10/1988 |
| EP | 1 286 362 A1 | 2/2003 |
| JP | 2005-171230 A | 6/2005 |
| JP | 2007-003975 A | 1/2007 |
| JP | 2007-075176 A | 3/2007 |
| JP | 2007-083580 A | 4/2007 |
| JP | 2007-084816 A | 4/2007 |
| JP | 2008-105402 A | 5/2008 |
| JP | 2008-120931 A | 5/2008 |
| JP | 2008-311220 A | 12/2008 |
| JP | 2009-026499 A | 2/2009 |
| JP | 2009-045774 A | 3/2009 |
| JP | 2009-045775 A | 3/2009 |
| WO | 97/23554 A1 | 7/1997 |
| WO | 2007/039521 A1 | 4/2007 |
| WO | 2007/046225 A1 | 4/2007 |
| WO | 2007/046226 A1 | 4/2007 |
| WO | 2007/052663 A1 | 5/2007 |
| WO | 2007/132942 A1 | 11/2007 |
| WO | 2008/016174 A1 | 2/2008 |
| WO | PCT/US2009/061667 | 4/2010 |
| WO | PCT/US2009/061671 | 4/2010 |
| WO | PCT/US2009/061673 | 4/2010 |

OTHER PUBLICATIONS

Erjavec, J. et al., "Wave Polymerization during Vapor Deposition of Porous Parylene-N Dielectric Films," *Materials Research Society Symposium Proceedings*, 1999, vol. 565, pp. 23-28.

Sawyer, L.C. et al., "Chapter 4: Specimen Preparation Methods," *Polymer Microscopy*, 3rd Edition, 2008, index and pp. 132-247.

Plummer, H.K. Jr., "Reflections on the Use of Microtomy for Materials Science Specimen Preparation," *Microscopy and Microanalysis*, 1997, vol. 3, pp. 239-260.

Fredericks, P.M., "Depth Profiling of Polymers by Vibrational Spectroscopy," *Vibrational Spectroscopy of Polymers: Principles and Practice*, 2007, pp. 179-200.

Treado, P.J. et al., "Raman Imaging," Handbook of Raman Spectroscopy: From the Research Laboratory to the Process Line, 2001, Chapter 5, pp. 191-249.

Cherney, D.P. et al., "Comparison of Discrete and Continuous Motion in Scanning Probe Microscopy Monitored via Confocal Raman Microspectroscopy," *Applied Spectroscopy*, 2008, vol. 62, No. 6, pp. 617-623.

Pelletier, M.J., "Analytical Applications of Raman Spectroscopy," *Blackwell Science*, 1999, Chapter 1, cover, contents and pp. 1-52.

Sun, T. et al., "Effect of Short Chain Branching on the Coil Dimensions of Polyolefins in Dilute Solution," Macromolecules, 2001, vol. 34, No. 19, pp. 6812-6820.

* cited by examiner

MICROPOROUS MEMBRANE, METHODS FOR MAKING SUCH FILM, AND THE USE OF SUCH FILM AS BATTERY SEPARATOR FILM

CROSS-REFERENCE TO RELATED APPLICATIONS

This application claims priority from U.S. Provisional Application Ser. No. 61/118,104, filed Nov. 26, 2008, and EP 09151316.8 filed Jan. 26, 2009, the contents of each of which are incorporated by reference in their entirety.

FIELD OF INVENTION

Embodiments of the present invention generally relate to microporous membrane, methods for making microporous membrane, and the use of microporous membrane as battery separator film. More particularly, the invention relates to a microporous membrane comprising a microporous membrane comprising a paraxylylene polymer. The paraxylylene polymer can be deposited (e.g., vapor-deposited) or laminated to a microporous substrate.

BACKGROUND

Microporous membranes have been used as battery separators in primary and secondary lithium batteries, lithium polymer batteries, nickel-hydrogen batteries, nickel-cadmium batteries, nickel-zinc batteries, and silver-zinc secondary batteries. The performance of such microporous membranes significantly affects the properties, productivity, and safety of the battery.

Battery separator film is generally produced with a relatively high permeability for the battery's electrolyte. It is desirable for the battery separator film to retain its electrolyte permeability while the battery is exposed to relatively high temperatures, as might be encountered during battery manufacturing, testing, and use, so that the battery does not experience an undue loss of power or capacity.

In most cases, it is desirable for the battery separator film to have a relatively low shutdown temperature ("SDT") and relatively high meltdown temperature ("MDT") for improved battery-safety properties, particularly at relatively high battery temperature as might occur as a result of overcharging or rapid discharging. Shut-down is believed to occur when ion mobility through the pores of the membrane is impaired or blocked all-together. Melt-down occurs when the membrane loses its structural integrity, potentially resulting in a short-circuit in the battery.

While improvements have been made, there is still a need for relatively thin microporous membrane useful as battery separator film having an increased MDT while at least maintaining acceptable performance with respect to other desirable properties, such as puncture, shrink, and permeability.

SUMMARY

A microporous membrane comprising a paraxylylene polymer or copolymer. In particular embodiments, the paraxylylene polymer or copolymer derived from a repeat unit of the formula:

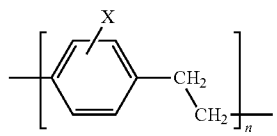

wherein n is an integer having a value of greater than or equal to 2 and X is a functional group selected from the group consisting of hydrogen, linear or branched substituted or unsubstituted $C_1$-$C_{10}$ alkyl; linear or branched, substituted or unsubstituted $C_1$-$C_{10}$ haloalkyl; substituted or unsubstituted $C_6$-$C_{20}$ aryl, $C_6$-$C_{20}$ haloaryl and perhaloaryl, linear or branched, substituted or unsubstituted $C_2$-$C_{10}$ alkenyl, and linear or branched substituted or unsubstituted $C_2$-$C_{10}$ haloalkenyl groups.

In other particular embodiments, the paraxylylene polymer or copolymer is derived from a repeat unit of the formula:

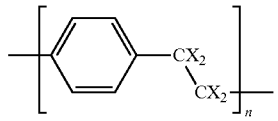

wherein n is an integer having a value of greater than or equal to 2 and each X is in dependently selected from hydrogen, chlorine and fluorine.

In still other embodiments, the paraxylylene polymer or copolymer is derived from a repeat unit of the formula:

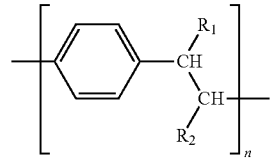

wherein n is an integer having a value of greater than or equal to 2 and $R_1$ and $R_2$ are each functional groups independently selected from the group consisting of hydrogen, hydroxyl, nitro, halide, linear or branched substituted or unsubstituted $C_1$-$C_{10}$ alkyl; linear or branched, substituted or unsubstituted $C_1$-$C_{10}$ haloalkyl; substituted or unsubstituted $C_6$-$C_{20}$ aryl, $C_6$-$C_{20}$ haloaryl and perhaloaryl, linear or branched, substituted or unsubstituted $C_2$-$C_{10}$ alkenyl, and linear or branched substituted or unsubstituted $C_2$-$C_{10}$ haloalkenyl groups. Embodiments where $R_1$ and $R_2$ are phenyl, fluoride or chloride are envisioned.

In particular embodiments, the membrane includes microporous polymeric membrane substrate, preferably comprising at least one of polyethylene or polypropylene, in addition to the paraxylylene polymer or copolymer. In some such embodiments, the microporous membrane comprises a 0.1 to 5.0 wt. % paraxylylene polymer or copolymer and a 95.0 to 99.9 wt. % of a microporous polyolefin membrane substrate, based on the weight of the membrane, wherein the paraxylylene polymer or copolymer comprises fluorine and the microporous polyolefin substrate comprises 1 wt. % to 20 wt. % of polyethylene having an Mw>$1.0\times10^6$; and 80 wt. % to 99 wt. % of polyethylene having an Mw≤$1.0\times10^6$, based on the weight of the substrate, the membrane having a shutdown temperature of >145° C. and an MD/TD shrink ratio measured at 130° C.>0.95 and a TD heat shrinkage at 130° C.≤2.5% and MD heat shrinkage at 130° C.≤2.5.

In another aspect the invention provides a membrane comprising a paraxylylene polymer or copolymer and a microporous polymeric membrane substrate, wherein the concentration of the paraxylylene polymer or copolymer that varies in the thickness direction of the membrane.

In particular embodiments, the membranes of the invention, have elevated meltdown temperatures, e.g., 230° C. to 800° C. Additionally, embodiments of the invention have one or more of the following properties: i) a normalized air permeability≤600 sec/100 cm3/20 µm; ii) a porosity in the range of from about 25% to about 80%; iii) a normalized pin puncture strength≥3,000 mN/20 µm; iv) a tensile strength≥40,000 kPa; v) an electrolytic solution absorption speed≥2.0, vi) a TD heat shrinkage at 105° C.≤2.5%; and/or vii) a TD heat shrinkage at 130° C.≤15%.

Another aspect of the invention relates to battery separator film comprising a paraxylylene polymer or copolymer and, optionally, a microporous polymeric substrate.

Yet another aspect of the invention relates to methods for producing a microporous membrane that include combining at least a first paraxylylene polymer or copolymer and a microporous polymeric membrane substrate. In some embodiments, the paraxylylene polymer or copolymer is formed on the microporous polymeric substrate by vapor phase deposition. In other embodiments, the paraxylylene polymer or copolymer is laminated to the microporous polymeric membrane substrate.

Still another aspect of the invention relates to battery comprising an anode, a cathode, an electrolyte, and a separator situated between the anode and the cathode, the separator comprising: a microporous polymeric membrane comprising a paraxylylene polymer or copolymer, and optionally a microporous polymeric substrate. In particular embodiments, the paraxylylene polymer or copolymer comprises fluorine or chlorine.

DETAILED DESCRIPTION

Figure 1:
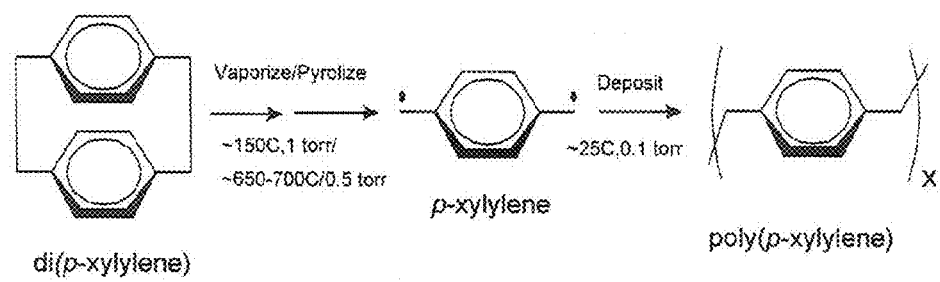
FIG. 1 illustrates an embodiment of the paraxylylene polymer formation process.

All patents, test procedures, and other documents cited herein, including priority documents, are fully incorporated by reference to the extent such disclosure is not inconsistent and for all jurisdictions in which such incorporation is permitted. When numerical lower limits and numerical upper limits are listed herein, ranges from any lower limit to any upper limit are contemplated.

As used herein the term "polymeric membrane substrate" is intended to mean substrates that contain a polymer. Polymeric substrates may contain other substances in addition to the polymer, e.g. fillers, ceramic particles, or other materials, as is known in the art.

The term "polymer" as used herein, generally includes but is not limited to, homopolymers, copolymers (such as for example, block, graft, random and alternating copolymers), terpolymers, etc. and blends and modifications thereof. Furthermore, unless otherwise specifically limited, the term "polymer" shall include all possible geometrical configurations of the material. These configurations include, but are not limited to isotactic, syndiotactic and random symmetries.

The term "polyolefin" as used herein, is intended to mean any of a series of largely saturated polymeric hydrocarbons composed only of carbon and hydrogen. Typical polyolefins include, but are not limited to, polyethylene, polypropylene, polymethylpentene and various combinations of the monomers ethylene, propylene, and methylpentene.

The term "polyethylene" as used herein is intended to encompass not only homopolymers of ethylene, but also copolymers wherein at least 85% of the recurring units are ethylene units.

The term "polypropylene" as used herein is intended to encompass not only homopolymers of propylene, but also copolymers wherein at least 85% of the recurring units are propylene units.

Unless specifically mentioned, the terms "polyparaxylene," "polyparaxylylene," "poly(di-p-xylene)" and "paraxylylene polymer" and like are used synonymously herein to indicate polymeric species derived from substituted and unsubstituted di-p-xylylene dimers as further described herein.

It has been surprisingly found microporous membrane substrate, such as a battery separator film ("BSF") comprising a paraxyleyne polymer or copolymer can be prepared. The paraxylynene provides and improved MDT compared to conventional microporous membranes. In some embodiments, the MDT is improved without significantly affecting the BSF's permeability a layer or coating of the paraxylylene polymer or copolymer. In some embodiments, another important property such as puncture strength is improved by the presence of the paraxylylene coating or layer. Other embodiments provide acceptable permeability and improved puncture without significantly deleteriously affecting other film properties such heat shrinkage and/or tensile strength.

Where a microporous polymeric membrane is combined with a paraxyleyne polymer or copolymer results in a BSF having a higher MDT without degrading battery performance. The paraxyleyne polymer or copolymer can be laminated to or deposited onto the microporous polymeric membrane substrate.

Where a microporous polymeric membrane comprising polyethylene is combined with a paraxyleyne polymer or copolymer results in a BSF having a higher MDT and/or shut-down temperature (SDT) without degrading battery performance. The paraxyleyne polymer or copolymer can be laminated to or deposited onto the microporous polymeric membrane substrate.

Paraxylylene Polymer or Copolymer

In one embodiment, the paraxylylene polymer comprises n-poly(paraxylylene) (Parylene N), poly(chloro-para-xylylene) (Parylene C), poly(dichloro-para-xylylene) (Parylene D). In a more specific embodiment, one or more of the ring- and/or alpha-hydrogen atoms in the di-para-xylylene precursor is replaced with fluorine to produce a fluorinated paraxylylene polymers. In particular embodiments, the alpha-hydrogens are replaced with fluorine, such as Parylene HT. Each of Parylene N, Parylene C, Parylene D, at Parylene HT available from Specialty Coatings Systems, Indianapolis, Ind., USA. Selected Properties of Parylene polymers are reproduced in Table 1.

TABLE 1

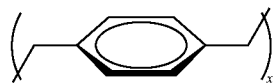

Parylene N

Parylene C

Parylene HT

Selected Properties* of Parylene Polymers

| Parylene Type | Melting Peak, C | Tensile Strength, MPa | Young's Modulus, MPa | Density g/cm$^3$ | Refractive Index |
|---|---|---|---|---|---|
| C | 290 | 69 | 2756 | 1.289 | 1.639 |
| N | 410 | 45 | 2411 | 1.110 | 1.661 |
| HT | >500 | 51.7 | 2550 | 1.32 | 1.559 |

*http://www.vp-scientific.com/parylene_properties.htm

Some particular substituted paraxylylene polymers are derived from a repeat unit of the formula:

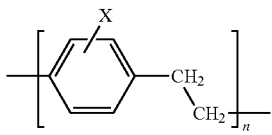

wherein n is an integer having a value of greater than or equal to 2 and X is a functional group selected from the group consisting of hydrogen, linear or branched substituted or unsubstituted $C_1$-$C_{10}$ alkyl; linear or branched, substituted or unsubstituted $C_1$-$C_{10}$ haloalkyl; substituted or unsubstituted $C_6$-$C_{20}$ aryl, $C_6$-$C_{20}$ haloaryl and perhaloaryl, linear or branched, substituted or unsubstituted $C_2$-$C_{10}$ alkenyl, and linear or branched substituted or unsubstituted $C_2$-$C_{10}$ haloalkenyl groups, amino, cyano, $C_2$-$C_{10}$ carboxyl, $C_2$-$C_{10}$alkoxy $C_2$-$C_{10}$ hydroxyalkyl, hydroxyl, nitro, or halide groups. In particular embodiments where X is an amino, cyano, $C_2$-$C_{10}$ carboxyl, $C_2$-$C_{10}$ alkoxy, or $C_2$-$C_{10}$ hydroxyalkyl group may be advantageously used. In some embodiments, X is $CF_3$ or $CH_2CH_2(CF_2)_mCF_3$ wherein m ranges from 1 to about 20, preferably from 1 to 10, or 1 to 5. Particular paraxylylene polymers or copolymers are substituted such that X is $CH_2CH_2(CF_2)_5CF_3$. Such paraxylylene polymers are described in U.S. Patent Application Publication No. 2007/0099019.

In other embodiments, the paraxylylene polymer is derived from a repeat unit of the formula:

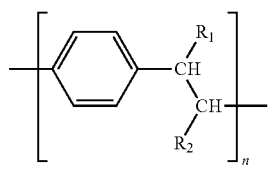

wherein n is an integer having a value of greater than or equal to 2 and $R_1$ and $R_2$ are each functional groups independently selected from the group consisting of hydrogen, linear or branched substituted or unsubstituted $C_1$-$C_{10}$ alkyl; linear or branched, substituted or unsubstituted $C_1$-$C_{10}$ haloalkyl; substituted or unsubstituted $C_6$-$C_{20}$ aryl, $C_6$-$C_{20}$ haloaryl and perhaloaryl, linear or branched, substituted or unsubstituted $C_2$-$C_{10}$ alkenyl, and linear or branched substituted or unsubstituted $C_2$-$C_{10}$ haloalkenyl groups.

In particular coatings $R_1$ and $R_2$ are selected to be phenyl such that the paraxylylene polymer is derived from a repeat unit of the formula:

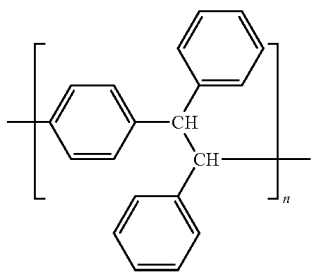

Such paraxylylene polymers are described in U.S. Patent Application Publication No. 2007/0099019

In other embodiments, $R_1$ and $R_2$ are each functional groups independently selected from the group consisting of hydroxyl, nitro, and halide groups. In certain films, at least one of $R_1$ and $R_2$ is fluoride or chloride.

In still other embodiments, $R_1$ and $R_2$ are substituted phenyl groups such that the paraxylylene polymer is derived from a repeat unit of the formula:

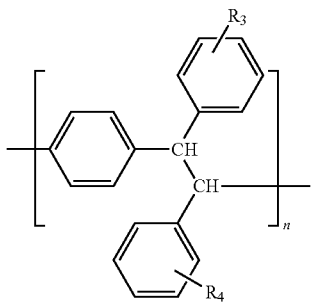

wherein n is an integer having a value of greater than or equal to 2 and $R_3$ and $R_4$ are each functional groups independently selected from the group consisting of hydrogen, linear or branched substituted or unsubstituted $C_1$-$C_{10}$ alkyl; linear or branched, substituted or unsubstituted $C_1$-$C_{10}$ haloalkyl; substituted or unsubstituted $C_6$-$C_{20}$ aryl, $C_6$-$C_{20}$ haloaryl and perhaloaryl, linear or branched, substituted or unsubstituted $C_2$-$C_{10}$ alkenyl, and linear or branched substituted or unsubstituted $C_2$-$C_{10}$ haloalkenyl groups. In certain films, $R_3$ is hydrogen and $R_4$ is methyl. Such paraxylylene polymers are described in U.S. Patent Application Publication No. 2007/0099019. In other embodiments, at least one of $R_3$ and $R_4$ is a halide such as fluoride or chloride.

In some paraxylylene polymers one or more hydrogen atoms on at least one of the alpha carbon atoms of the of the repeat unit are each independently replaced by $C_1$-$C_{10}$ substituted or unsubstituted alkyl, $C_6$-$C_{20}$ substituted or unsubstituted aryl, $C_2$-$C_{10}$ alkenyl, amino, cyano, $C_2$-$C_{10}$ carboxyl, $C_2$-$C_{10}$ alkoxy, $C_2$-$C_{10}$ hydroxyalkyl, hydroxyl, nitro, or halide groups, particularly fluorine. In a more specific embodiment, each of the alpha hydrogen atoms is replaced with fluorine. It is also envisioned that the phenyl rings in the above described paraxylylene polymer could be multiply substituted by the functional groups described above, particularly by halides such as fluoride or chloride.

In another embodiment, the paraxylylene polymer is a copolymer of poly(ethynyl-p-xylylene) and polyp-xylylene). It exhibits thermal stability to at least 420°, has a low coeff. of thermal expansion of 55 ppm after it is crosslinked, and exhibits low stress. It possesses a glass transition temp. of about 73° and starts to crosslink at apprx. 160° with a peak isotherm at 250°. The ethynyl functional groups crosslink to form the very stable Ph moiety as described in Thermomechanical properties of Parylene X, a room-temperature chemical vapor depositable crosslinkable polymer by Senkevich et al., Chemical Vapor Deposition (2007), 13(1), 55-59. Publisher: Wiley-VCH Verlag GmbH & Co. KGaA, CODEN: CVDEFX ISSN: 0948-1907.

The molecular weight of the paraxylylene polymer is not critical. While in some cases, dimers and higher oligomers may be suitable, generally the molecular weight should be high enough that the paraxylylene polymer forms a solid. In some embodiments, the paraxylylene polymer comprises oligomers having at least 10, 15, 20, 25, 30, 35, 40, or 50 repeat units. The extent of oligomerization can be determined by $^{13}C$ NMR, GC-Mass Spectrometry or a combination thereof. The paraxylylene polymer can also be characterized by the molecular weight. In some embodiments, the paraxylylene polymer will have a weight averaged molecular weight, Mw, ranging from about 100,000 g/mol to about 1,000,000 g/mol, particularly about 300,000 g/mol to about 700,000 g/mol, more particularly about 500,000 g/mol.

In particular embodiments, the paraxylylene polymer is formed in a manner that provides a porous paraxylylene polymer. Such porous paraxylylene polymers are described for example in Wave polymerization during vapor deposition of porous parylene —N dielectric films, by Erjavec, James; Sikita, John; Beaudoin, Stephen P.; Raupp, Gregory B., Department of Chemical, Bio, and Materials Engineering, Arizona State University, Tempe, Ariz., USA; Materials Research Society Symposium Proceedings (Materials Research Society 1999), 565 (Low-Dielectric Constant Materials V). As described therein, Parylene-N films that have been vapor deposited near liquid nitrogen temperatures (~77 K) undergo a polymerization process that produces a highly porous polymer film. The porosity of such paraxylylene films is reportedly greater than 80%. Porous paraxylylene polymers other than Parylene N are contemplated, specifically any of the above described paraxylylene polymers may be formed to provide a porous polyparaxylene on the polyolefin substrate or they may be formed separately and laminated to the substrate. In such cases, the porosity, pore size and distribution and well as pore profile of the paraxylylene layer may be the same or different from the corresponding features of the polyolefin substrate.

Method for Producing the Paraxylylene Polymer or Copolymer

The paraxylylene polymer or copolymer can be produced by any convenient method. While the production of the paraxylylene polymer or copolymer will be described in terms of pyrolysis, the invention is not limited thereto, and the following description is not meant to foreclose other embodiments within the broader scope of the invention. In one embodiment, the paraxylylene polymer or copolymer is formed by a vapor-deposition technique, such as chemical vapor deposition (CVD). Methods for depositing paraxylylene polymers and copolymers by CVD are described in U.S. Pat. Nos. 5,302,767; 5,841,005; 5,538,758; 5,841,005, EP-A-1 286 362, EP-A-286 263, EP-A-286 264, and EP-A-286 265. Schematically such an exemplary deposition proceeds as shown in FIG. 1.

In such a reaction scheme, di-para-xylene is vaporized at an elevated temperature (e.g., about 150° C.) and under reduced pressure of about 1 torr. The vaporized di-para-xylene is pyrolyzed. Although the conditions are not critical, the pyrolysis typically is performed at about 650° C. to 700° C. and at about 0.5 torr. Deposition rates are not critical. Typical deposition rates range from about 2 to 100 nm/sec, particularly about 10 to 20 nm/sec. Under pyrolysis conditions, it is believed that p-xylylene is formed and upon cooling under reduced pressure (typically about 0.1 torr) forms paraxylylene polymer (also referred to as polyp-xylylene)). Substituted paraxylylene polymers may be prepared from corresponding substituted di-para-xylylene precursors. Paraxylylene copolymers may be prepared by copyrolysis of two or more different substituted or unsubstituted di-para-xylylene precursors. In particular embodiment, the invention utilizes an adhesion promoter such as Silquest™ A-174, Silquest™ 111 or Silquest™ A-174(NT), as described in US Pat. Pub. No. 2009-0263641. This step is particularly advantageous to promote adhesion of the paraxylylene polymer or copolymer to hydrophilic surfaces.

Composite Structure

In an embodiment, the paraxylylene polymer or copolymer is combined with a microporous membrane by, e.g., lamination or by producing the paraxylylene polymer or copolymer on the membrane, where the phrase "producing the paraxylylene polymer or copolymer on the membrane" means that the paraxylylene polymer or copolymer is deposited from the vapor phase onto the microporous membrane. In other words, in an embodiment where the paraxylylene polymer or copolymer is produced on the membrane, the paraxylylene polymer or copolymer is formed at the time it is applied to the microporous membrane. The combined paraxylylene polymer or copolymer and microporous membrane, e.g., in the form of a coated microporous membrane, is useful as battery separator film. A second paraxylylene polymer or copolymer can be combined with the microporous membrane, if desired. The second paraxylylene polymer or copolymer, which can be produced by the same methods and from the same materials as the first paraxylylene polymer or copolymer, can be combined with the microporous membrane by, e.g., lamination or producing the second paraxylylene polymer or copolymer on the first paraxylylene polymer or copolymer or by deposition to a second surface of the microporous membrane.

In embodiments where the paraxylylene polymer or copolymer is laminated to a microporous membrane, the resulting film can have, e.g., an A/B/A structure, an A/B/C structure, an A/B1/A/B2/(A, B1, C, or D) structure, an A/B1/C/B2/(A, B1, C, or D), or combinations and continuations (repeating or otherwise) thereof. In these exemplary structures, A represents a paraxylylene polymer or copolymer, B represents a microporous membrane, C represents a second paraxylylene polymer or copolymer, and D represents either a yet another paraxylylene polymer or copolymer or a microporous membrane.

As used herein, when the term "thickness" refers to a layer or coating of the paraxylylene polymer, the term "thickness" should be understood to mean the thickness of the paraxylylene coating formed on a nonporous reference substrate (e.g. a silicon wafer) located in the deposition chamber as close as reasonably possible to the substrate membrane during the deposition process. For example, a membrane described as having a paraxylylene coating thickness of 25 nm refers to a membrane that has been exposed to deposition conditions that form a 25 nm thick coating on the nonporous reference substrate. Thus, typical deposition conditions provide a coating thickness (i.e., the thickness of the paraxylylene polymer that forms on the nonporous reference substrate) in the range of about 5 to 100 nm, particularly about 25-60 nm. The coating weight is approximately 10 m g/m$^2$ to 200 mg/m$^2$, particularly in the range of about 20 mg/m$^2$ to about 100 mg/m$^2$. In particular membranes comprise about 0.05 wt. % to about 3 wt. %, particularly about 0.1 wt. % to 2 wt. %, paraxylylene polymer, based on the total weight of the substrate and paraxylylene polymer Particular membranes comprise about 0.05 wt. % to about 3 wt. %, particularly about 0.1 wt. % to 2.0 wt. %, more particularly 0.3 wt. % to 1.0 wt. % paraxylylene polymer, based on the total weight of the substrate and paraxylylene polymer.

Figure 5:
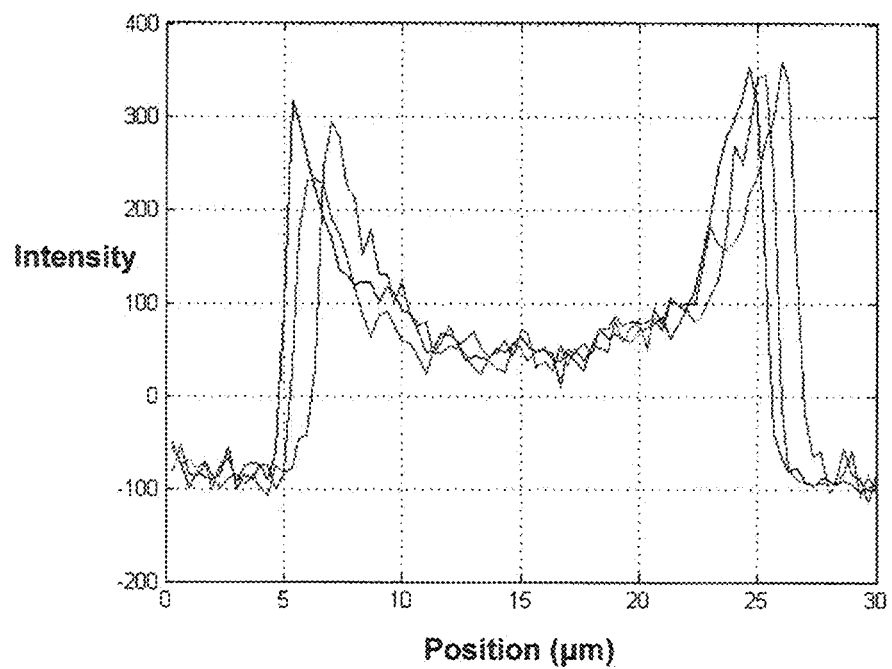
FIG. 5 depicts the Confocal Raman Spectra of the relative concentration of paraxylylene polymer in the thickness direction of the membrane at three different points on the membrane of Example 15.

In other embodiments where the paraxylylene polymer or copolymer is produced on the membrane, the paraxylylene polymer may form a coating of the microporous substrate, optionally coating individual microfibers of the membrane. The fibers may not be coated equally, however. As FIG. 5 illustrates, some embodiments where paraxylylene polymer or copolymer is produced on the membrane, the composite structure may have a concentration that varies in the thickness direction of the composite structure. Such embodiments may be described with respect to various points, $(d_n)$, along the membrane thickness (D), where "n" represents the fractional distance from a first surface of the membrane, e.g. $(d_0)$ represents a point at the first surface of the paraxylylene-containing layer of the membrane, $(d_{0.5})$ represents a point midway through the membrane, and $(d_{1.0})$ represents a point at the second surface of the paraxylylene-containing layer of the membrane, wherein $(d_0)$ and $(d_{1.0})$ are the respective maxima of the peaks associated with the paraxylylene polymer obtained from the Confocal Raman Data, and $(d_{1.0})$-$(d_0)$ is equal to the nominal thickness (D) of the membrane. In particular embodiments, the concentration of the paraxylylene polymer or copolymer at a first surface $(d_0)$ of the membrane has a concentration less than 1000, less than 500, less than 100, less than 50, less than 25, less than 20, less than 10, less than 5, or less than 2 times greater than the concentration of the paraxylylene polymer or copolymer at the midpoint $(d_{0.5})$ of the membrane in the thickness direction. In other embodiments, the $(d_0)$:$(d_{0.5})$ ratio ranges from 1.95 to 1.0. Alternatively, or additionally, the films may be described as having a distribution of the paraxylylene polymer in the thickness direction wherein the width of the peak associated with the paraxylylene polymer at $(d_0)$ obtained from the Confocal Raman Data at half its maximum intensity (i.e. peak width at half maximum) has a range whose lower limit is 0.05D, 0.1D, 0.2D, 0.3D, 0.4D, 0.5D, or 0.6D and whose upper limit may be 0.1D, 0.2D, 0.3D, 0.4D, 0.5D, or 0.6D, e.g., 0.05D-0.6D, 0.1D to 0.5D, 0.2D-0.4D or 025D to 0.35D. D- and (O-values as well as relative concentration of the paraxyxlylene polymer may be determined by averaging several Confocal Raman spectra obtained by the following procedure.

To determine the concentration of the paraxylylene polymer or copolymer in the thickness direction, the following procedure can be used. Films were embedded in epoxy to fill the pores with a polymeric material in order to improve Raman data collection, as described in L C Sawyer, D T Grubb, G F Meyers, *Polymer Microscopy* 3$^{rd}$ Ed. (Springer Science+Business Media: New York), 2008, ch. 4. A 4×8 mm (approximately) sample of films including the paraxylylene polymer or copolymer are cut, preferably from the interior of films to avoid potential edge effects in the film. The sample film is covered with droplets of Epofix™ epoxy (Electron Microscopy Services) in weigh dishes. A ratio of approximately 25 g resin with 3 g accelerator is used, and the sample is placed under reduced pressure to allow the epoxy to penetrate into the pore space of the sample. The sample is then transferred to a flat embedding mold and the remaining volume of the mold is filled with epoxy. The embedding mold is placed in an oven at 60° C. overnight to harden. The resulting sample is placed between polarizer sheets to allow a birefringent image of the film to be seen. The embedded sample is then cryofaced at −90° C. using glass knives in a Leica Ultracut UCT with EMFCS cryostage. Microtomy is a common sample preparation step in polymer microscopy, as described in L C Sawyer, D T Grubb, G F Meyers, *Polymer Microscopy* 3$^{rd}$ Ed. (Springer Science+Business Media: New York), 2008, ch. 4 and also in H K Plummer Jr., *Microscopy and Microanalysis*, 3, 239-260 (1997). The products of microtomy are thin sections of sample and/or a smooth sample block face. In cryomicrotomy the gas, sample, and glass knife are cooled, in this case to −90° C., with continuously evaporating nitrogen so that thin sections are removed from the epoxy/sample block and a smooth surface is left on the epoxy/sample block face. Films are embedded and faced because the xy resolution of the instrument is approximately ⅓ μm, whereas the depth resolution is closer to 2 μm at the surface. Embedding and facing the film samples allowed for the approximate 6-fold improvement in spatial resolution through the thickness of the film. It has been previously noted that collecting data from an exposed edge is the most accurate method for depth profiling via Raman microscopy, as noted in P M Fredericks in *Vibrational Spectroscopy of Polymers: Principles and Practice*, N J Everall, J M Chalmers, P J Griffiths Eds. (John Wiley & Sons, Inc.: Hoboken, N.J.), 2007.

Confocal Raman Microscopy data are collected using a CRM200 confocal Raman microscope system (WITec Gmbh) operating with a 785 nm diode laser and a CCD detector cooled below −75° C., see e.g., WITec Confocal Raman Microscope CRM 200 operating manual. A 100×, type MPL near IR optimized, 0.9 NA without cover glass correction (Olympus) microscope standard is used. General overviews of Raman imaging are available in the literature, for example as described in P J Treado and M P Nelson in *Handbook of Raman Spectroscopy: From the Research Laboratory to the Process Line*, I R Lewis and H G M Edwards Eds. (Marcel Dekker, Inc.: New York), 2001, ch. 5. Data described here are collected with point-by-point scanning; each pixel corresponds to a spectrum acquired with the laser focused at each single point in the sample approximately described by the diffraction-limited spot size. Samples are mounted in a sample holder (with a screw on the side) typically used for atomic force microscopy. The holder is used so that the microtomed face of the embedded sample was held approximately normal, i.e. perpendicular, to the direction of laser propagation. The holder is attached to the stage under the microscope with double-sided tape to prevent unintentional sample movement during analysis. Films placed beneath the microscope objective were located with an optical camera before spectral acquisition. The sample surface was brought into focus by minimizing the visible Airy disk produced by the laser at the sample surface.

Raman spectra are acquired over a region of 30 μm×20 μm with a 1 sec. acquisition time at each location. The sample is rastered beneath the microscope objective to collect data over the specified area. Ninety spectra comprise each row (30 μm) and sixty spectra (20 μm) comprise each column in the data set. Each pixel in the data set corresponds to a full spectrum at a specific location in the sample. Data spacing is chosen based on the resolution of the optics in the system, as described in D P Cherney and D A Winesett, *Applied Spectroscopy*, 62 (6), 617-623 (2008). Although the depth resolution is close to 2 microns, it is assumed that the concentration profile at each specific distance from the surface of the film is approximately constant.

The Raman spectra obtained from the instrument are then analyzed. The offset of each spectrum is removed with a second order polynomial function in WITec Project v. 1.90 software. The area of a peak corresponding to the paraxylylene polymer is used to monitor the concentration of the paraxylylene polymer in the material. A Raman spectrum of a sample is a linear combination of the scattering from each of the individual components in the sample, see e.g., M J Pelletier, ed. *Analytical Applications of Raman Spectroscopy* (Blackwell Science: Malden, Mass.), 1999, ch. 1. Consequently, the Raman scattering of the substrate membrane (typically polyethylene), the paraxylylene polymer, and epoxy can be mapped over space by plotting the peak area corresponding to each specific component at each pixel. Any potential crystallinity variation and polarization dependence of the molecules was neglected as it was not expected to have a significant effect on the data interpretation. Pure component spectra of the substrate membrane and epoxy are previously obtained to ensure that the monitored paraxylylene polymer peaks originate from Raman scattering by paraxylylene polymer molecules. Peak areas are determined within the WITec Project software using the filter manager. A region of the spectrum is defined by the user to include the peak of interest. The pixel to the left and right of the defined region is used as a line providing the baseline for the peak area calculation. The peak area at each pixel within an image is calculated using identical conditions and saved as a matrix. This matrix describes the concentration of paraxylene over the analyzed area. The matrix is plotted within the WITec software as x-position vs. y-position vs. color intensity.

Since the graphing functions are limited, the matrix is exported as an ASCII file and imported into Matlab (version 7.x) for additional plotting. The two-dimensional plots include three different lines. Each line is the average of three consecutive rows (each row is a cross-sectional map of paraxylylene polymer scattering across the film). Averaging is performed with simple routines. Two-dimensional lines are plotted as distance vs. area under paraxylylene polymer at each pixel (averaged). The maxima between the two surfaces of the film are approximately 25 um apart, the thickness of the film upon which the paraxylene was coated. This result indicates that the dimensions of the film were not significantly changed by embedding the samples in the epoxy.

Microporous Membrane Substrate

The substrate is not critical. Particular substrates comprise a polymer film having a desired combination of properties, e.g., porosity and permeability, and prepared by a so-called dry process, as described in, e.g., US20070238017, WO2007046225 A1, WO2007046226 A1, WO2007039521 A1, JP2007084816 A, JP2007083580 A, JP2007075176 A, JP2007003975 A. In an embodiment, the microporous membrane substrate is an extrudate produced from at least one diluent and at least one polyolefin. The polyolefin can be any polyolefin, including polyethylene, polypropylene, homopolymers thereof and copolymers thereof. Optionally, inorganic species (such as species containing silicon and/or aluminum atoms), and/or heat-resistant polymers such as those described in PCT Publications WO 2007/132942 and WO 2008/016174 can be used to produce the extrudate. In an embodiment, these optional species are not used. In particular embodiments, the substrate comprises a beta-nucleated polypropylene, e.g. as described in JP2008120931A, JP2009026499 A, JP2008105402 A, JP2008311220, JP2009045774, JP2009045775 A WO2007046225, JP2005171230 A. In at least one specific embodiment, the extrudate includes a first polyethylene and/or a second polyethylene and/or a polypropylene, each described below. In another embodiment, the microporous membrane substrate is prepared by the dry-process may also be used herein. Such films and their methods of manufacture are described in numerous U.S. and International patents and patent applications. Other suitable substrates include synthetic paper as described in U.S. Pat. Nos. 4,681,750, 5,935,543, 5,922,298, 5,605,569 and available from PPG, Inc. under the tradename Teslin®. In other embodiments, the substrate has been formed by a layer multiplication or solvent etching process as described in PCT/2009/061667, PCT/2009/061671, and PCT/2009/061673.

In particular embodiments, the substrate comprises one or more polyethylenes (e.g. first and second polyethylenes) and optionally another polyolefin, e.g., polypropylene. Exemplary first and second polyethylenes and the option polypropylene are now described.

The First Polyethylene

The first polyethylene has an Mw≤1.0×10$^6$, e.g., in the range of from about 1.0×10$^5$ to about 9.0×10$^5$, for example from about 4.0×10$^5$ to about 8.0×10$^5$. Optionally, the polyethylene has an MWD≤50.0, e.g., in the range of from about 2.0 to about 30.0, such as from about 3.0 to about 20.0. For example, the first polyethylene can be one or more of a high density polyethylene ("HPDE"), a medium density polyethylene, a branched low density polyethylene, or a linear low density polyethylene.

In an embodiment, the first polyethylene has an amount of terminal unsaturation ≥0.20 per 10,000 carbon atoms, e.g., ≥5.0 per 10,000 carbon atoms, such as ≥10.0 per 10,000 carbon atoms. The amount of terminal unsaturation can be measured in accordance with the procedures described in PCT Publication WO97/23554, for example.

In an embodiment, the first polyethylene is at least one of (i) an ethylene homopolymer or (ii) a copolymer of ethylene and ≤10 mol. % of a comonomer such as polyolefin. The comonomer can be, for example, one or more of propylene, butene-1, pentene-1, hexene-1,4-methylpentene-1, octene-1, vinyl acetate, methyl methacrylate, or styrene.

The Second Polyethylene

The second polyethylene has an Mw>1.0×10$^6$, e.g., in the range of 1.1×10$^6$ to about 5.0×10$^6$, for example from about 1.2×10$^6$ to about 3.0×10$^6$, such as about 2.0×10$^6$. Optionally, the second polyethylene has an MWD≤50.0, e.g., from about 2.0 to about 30.0, such as from about 4.0 to about 20.0 or about 4.5 to 10.0. For example, the second polyethylene can be an ultra-high molecular weight polyethylene ("UHMWPE"). In an embodiment, the second polyethylene is at least one of (i) an ethylene homopolymer or (ii) a copolymer of ethylene and ≤10.0 mol. % of a comonomer such as polyolefin. The comonomer can be, for example, one or more of propylene, butene-1, pentene-1, hexene-1,4-methylpentene-1, octene-1, vinyl acetate, methyl methacrylate, or styrene. Such a polymer or copolymer can be produced using a single-site catalyst.

Mw and MWD of the polyethylenes and polypropylene are determined using a High Temperature Size Exclusion Chromatograph, or "SEC", (GPC PL 220, Polymer Laboratories), equipped with a differential refractive index detector (DRI). The measurement is made in accordance with the procedure disclosed in "*Macromolecules*, Vol. 34, No. 19, pp. 6812-6820 (2001)". Three PLgel Mixed-B columns available from (available from Polymer Laboratories) are used for the Mw and MWD determination. For polyethylene, the nominal flow rate is 0.5 cm$^3$/mm; the nominal injection volume is 300 μL; and the transfer lines, columns, and the DRI detector are contained in an oven maintained at 145° C. For polypropylene, the nominal flow rate is 1.0 cm$^3$/min; the nominal injection volume is 300 μL; and the transfer lines, columns, and the DRI detector are contained in an oven maintained at 160° C.

The GPC solvent used is filtered Aldrich reagent grade 1,2,4-Trichlorobenzene (TCB) containing approximately 1000 ppm of butylated hydroxy toluene (BHT). The TCB is degassed with an online degasser prior to introduction into the SEC. The same solvent is used as the SEC eluent. Polymer solutions are prepared by placing dry polymer in a glass container, adding the desired amount of the TCB solvent, and then heating the mixture at 160° C. with continuous agitation for about 2 hours. The concentration of polymer solution is 0.25 to 0.75 mg/ml. Sample solutions are filtered off-line before injecting to GPC with 2 μm filter using a model SP260 Sample Prep Station (available from Polymer Laboratories).

The separation efficiency of the column set is calibrated with a calibration curve generated using a seventeen individual polystyrene standards ranging in Mp ("Mp" being defined as the peak in Mw) from about 580 to about 10,000,000. The polystyrene standards are obtained from Polymer Laboratories (Amherst, Mass.). A calibration curve (log Mp vs. retention volume) is generated by recording the retention volume at the peak in the DRI signal for each PS standard and fitting this data set to a 2nd-order polynomial. Samples are analyzed using IGOR Pro, available from Wave Metrics, Inc.

The Polypropylene

The polypropylene has an Mw≥1.0×10$^5$, for example ≥1.0×10$^6$, or in the range of from about 1.05×10$^6$ to about 2.0×10$^6$, such as from about 1.1×10$^6$ to about 1.5×10$^6$. Optionally, the polypropylene has an MWD≤50.0, e.g., from about 1.0 to about 30.0, or about 2.0 to about 6.0; and/or a heat of fusion ("ΔHm")≥80.0 J/g or ≥1.0×10$^2$ J/g, e.g., 110.0 J/g to 120.0 J/g, such as from about 113.0 J/g to 119.0 J/g or from 114.0 J/g to about 116.0 J/g. The polypropylene can be, for example, one or more of (i) a propylene homopolymer or (ii) a copolymer of propylene and ≤10.0 mol. % of a comonomer. The copolymer can be a random or block copolymer. The comonomer can be, for example, one or more of α-olefins such as ethylene, butene-1, pentene-1, hexene-1,4-methylpentene-1, octene-1, vinyl acetate, methyl methacrylate, and styrene, etc.; and diolefins such as butadiene, 1,5-hexadiene, 1,7-octadiene, 1,9-decadiene, etc. Optionally, the polypropylene has one or more of the following properties: (i) the polypropylene is isotactic; (ii) the polypropylene has an elongational viscosity of at least about 50,000 Pa sec at a temperature of 230° C. and a strain rate of 25 sec$^{-1}$; (iii) the polypropylene has a melting peak (second melt) of at least about 160° C.; and/or (iv) the polypropylene has a Trouton's ratio of at least about 15 when measured at a temperature of about 230° C. and a strain rate of 25 sec$^{-1}$.

The polypropylene's ΔHm, Mw, and MWD are determined by the methods disclosed in PCT Patent Publication No. WO2007/132942. Optionally, the polypropylene is selected from among those disclosed in WO2007/132942.

In an embodiment, the polyolefin used to produce the extrudate comprises polypropylene present in an amount of from 1.0 wt. % to 50.0 wt. %, first polyethylene in an amount in the range of from 25.0 wt. % to 99.0 wt. %, and second polyethylene in the range of from 0 wt. % to 50.0 wt. %. The weight percents of the polypropylene and first and second polyethylenes are based on the weight of the polymer used to produce the extrudate. When the membrane comprises the polypropylene in amount >2.0 wt. %, and particularly >2.5 wt. %, the membrane generally has a meltdown temperature that is higher than that of a membrane which does not contain a significant amount of polypropylene.

In another embodiment, the membrane does not contain a significant amount of polypropylene. In this embodiment, the polyolefin used to produce the extrudate comprises less than 0.10 wt. % polypropylene, such as when the polyolefin consists of or consists essentially of polyethylene. In this embodiment, the amount of second polyethylene used to produce the extrudate can be, e.g., in the range of from 1.0 wt. % to 50.0 wt. %, such as from about 10.0 wt. % to about 40.0 wt. %; and the amount of first polyethylene used to produce the extrudate can be, e.g., in the range of from 60.0 wt. % to 99.0 wt. %, such as from about 70.0 wt. % to about 90.0 wt. %. The weight percents of the first and second polyethylenes are based on the weight of the polymer used to produce the extrudate.

Extrudate

The extrudate is produced by combining polymer and at least one diluent. The amount of diluent used to produce the extrudate can be in the range, e.g., of from about 25.0 wt. % to about 99.0 wt. % based on the weight of the extrudate, with the balance of the weight of the extrudate being the polymer used to produce the extrudate, e.g., the combined first polyethylene and second polyethylene.

The diluent is generally compatible with the polymers used to produce the extrudate. For example, the diluent can be any species capable of forming a single phase in conjunction with the resin at the extrusion temperature. Examples of the diluent include aliphatic or cyclic hydrocarbon such as nonane, decane, decalin and paraffin oil, and phthalic acid ester such as dibutyl phthalate and dioctyl phthalate. Among them, preferable is paraffin oil, which has a high boiling point, and contains small amount of volatile components. Paraffin oil with kinetic viscosity of 20-200 cSt at 40° C. can be used. The diluent can be the same as those described in U.S. Patent Publication Nos. 2008/0057388 and 2008/0057389.

While the extrudate and the microporous membrane can contain copolymers, inorganic species (such as species containing silicon and/or aluminum atoms), and/or heat-resistant polymers such as those described in PCT Publication WO 2008/016174, these are not required. In an embodiment, the extrudate and membrane is substantially free of such materials. "Substantially free" in this context means the amount of such materials in the microporous membrane is less than 1 wt. %, or less than 0.1 wt. %, or less than 0.01 wt. %, based on the total weight of the polymer used to produce the extrudate.

The microporous membrane generally comprises the polyolefin used to produce the extrudate. A small amount of diluent or other species introduced during processing can also be present, generally in amounts less than 1 wt. % based on the weight of the microporous membrane. A small amount of polymer molecular weight degradation might occur during processing, but this is acceptable. In an embodiment, molecular weight degradation during processing, if any, causes the MWD of the polymers in the membrane to differ from the MWD of the polymers used to produce the membrane by no more than about 50%, or no more than about 1%, or no more than about 0.1%.

In one or more embodiments, the microporous membrane comprises (a) from 1.0 wt. % to 50.0 wt. %, e.g., from about 2.5 wt. % to about 40.0 wt. %, such as from about 5.0 wt. % to about 30.0 wt. %, of polypropylene; (b) from 25.0 wt. % to 99.0 wt. %, e.g., from about 50.0 wt. % to about 90.0 wt. %, such as 60.0 wt. % to about 80.0 wt. % of a first polyethylene; and (c) from 0 wt. % to 50.0 wt. %, e.g., from about 5.0 wt. % to about 30.0 wt. %, such as about 10.0 wt. % to about 20.0 wt. % of a second polyethylene; the first polyethylene having an Mw≤$1.0 \times 10^6$, e.g., in the range of from about $1.0 \times 10^5$ to about $9.0 \times 10^5$, such as from about $4.0 \times 10^5$ to about $8.0 \times 10^5$, and an MWD≤50.0, e.g., in the range of from about 1.0 to about 30.0, such as from about 3.0 to about 20.0; the second polyethylene having an Mw>$1.0 \times 10^6$, e.g., in the range of about $1.1 \times 10^6$ to about $5.0 \times 10^6$, such as from about $1.2 \times 10^6$ to about $3.0 \times 10^6$, and an MWD≤50.0, e.g., from about 2.0 to about 30.0, such as from about 4.0 to about 20.0; and the polypropylene having an Mw>$1.0 \times 10^6$, e.g., from about $1.05 \times 10^6$ to about $2.0 \times 10^6$, such as about $1.1 \times 10^6$ to about $1.5 \times 10^6$, an MWD≤50.0, e.g., from about 1.0 to about 30.0, such as about 2.0 to about 6.0, and a ΔHm>$1.0 \times 10^2$ J/g, e.g., about 110.0 J/g to about 120.0 J/g, such as about 114.0 J/g to about 116.0 J/g.

In another embodiment, the microporous membrane contains polypropylene in an amount <0.1 wt. %, based on the weight of the microporous membrane. Such a membrane can comprise, for example, (a) from 1.0 wt. % to 50.0 wt. %, e.g., from about 10.0 wt. % to about 40.0 wt. %, of the second polyethylene; and (b) from 60.0 wt. % to 99.0 wt. %, e.g., from about 70.0 wt. % to about 90.0 wt. % of the first polyethylene; the first polyethylene having an Mw≤$1.0 \times 10^6$, e.g., in the range of from about $1.0 \times 10^5$ to about $9.0 \times 10^5$, such as from about $4.0 \times 10^5$ to about $8.0 \times 10^5$, and an MWD ≤50.0, e.g., in the range of from about 1.0 to about 30.0, such as from about 3.0 to about 20.0; and the second polyethylene having an Mw>$1.0 \times 10^6$, e.g., in the range of $1.1 \times 10^6$ to about $5.0 \times 10^6$, such as from about $1.2 \times 10^6$ to about $3.0 \times 10^6$, and an MWD≤50.0, e.g., from about 2.0 to about 30.0, such as from about 4.0 to about 20.0.

Optionally, the fraction of polyolefin in the membrane having a molecular weight >$1.0 \times 10^6$ is at least 1 wt. %, based on the weight of the polyolefin in the membrane, e.g., at least 2.5 wt. %, such as in the range of about 2.5 wt. % to 50.0 wt. %.

Method of Producing the Microporous Membrane

In one or more embodiments, the microporous membrane is produced by a process comprising: combining polymer and diluent, extruding the combined polymer and diluent through a die to form an extrudate; optionally cooling the extrudate to form a cooled extrudate, e.g., a gel-like sheet; stretching the cooled extrudate in at least one planar direction, or both; removing at least a portion of the diluent from the extrudate or cooled extrudate to form the membrane. Optionally, the process includes removing any remaining volatile species from the membrane; stretching the membrane, and/or heat setting the membrane. Optionally, the extrudate can be heat set before diluent removal, e.g., after extrudate stretching.

An optional hot solvent treatment step, an optional cross-linking step with ionizing radiation, and an optional hydrophilic treatment step, etc., as described in PCT Publication WO2008/016174 can be conducted if desired. Neither the number nor order of the optional steps is critical.

Combining Polymer and Diluent

The polymers as described above can be combined, e.g., by dry mixing or melt blending, and then the combined polymers can be combined with at least one diluent (e.g., a membrane-forming solvent) to produce a mixture of polymer and diluent, e.g., a polymeric solution. Alternatively, the polymer(s) and diluent can be combined in a single step. The polymer-diluent mixture can contain additives such as one or more antioxidant. In one or more embodiments, the amount of such additives does not exceed 1 wt. % based on the weight of the polymeric solution.

The amount of diluent used to produce the extrudate is not critical, and can be in the range, e.g., of from about 25 wt. % to about 99 wt. % based on the weight of the combined diluent and polymer, with the balance being polymer, e.g., the combined first and second polyethylene.

Extruding

In one or more embodiments, the combined polymer and diluent are conducted from an extruder to a die, and then extruded through the die to produce the extrudate. The extrudate or cooled extrudate should have an appropriate thickness to produce, after the stretching steps, a final membrane having the desired thickness (generally 3 μm or more). For example, the extrudate can have a thickness in the range of about 0.1 mm to about 10 mm, or about 0.5 mm to 5 mm. Extrusion is generally conducted with the mixture of polymer and diluent in the molten state. When a sheet-forming die is used, the die lip is generally heated to an elevated temperature, e.g., in the range of 140° C. to 250° C. Suitable process conditions for accomplishing the extrusion are disclosed in PCT Publications WO 2007/132942 and WO 2008/016174. The machine direction ("MD") is defined as the direction in which the extrudate is produced from the die. The transverse direction ("TD") is defined as the direction perpendicular to both MD and the thickness direction of the extrudate. The extrudate can be produced continuously from a die, or it can be produced from the die in portions (as is the case in batch processing) for example. The definitions of TD and MD are the same in both batch and continuous processing.

Formation of a Cooled Extrudate

The extrudate can be exposed to a temperature in the range of 15° C. to 25° C. to form a cooled extrudate. Cooling rate is not particularly critical. For example, the extrudate can be cooled at a cooling rate of at least about 30° C./minute until the temperature of the extrudate (the cooled temperature) is approximately equal to the extrudate's gelation temperature (or lower). Process conditions for cooling can be the same as those disclosed in PCT Publications No. WO 2008/016174 and WO 2007/132942, for example.

Stretching the Extrudate

The extrudate or cooled extrudate is stretched in at least one direction. The extrudate can be stretched by, for example, a tenter method, a roll method, an inflation method or a combination thereof, as described in PCT Publication No. WO 2008/016174, for example. The stretching may be conducted monoaxially or biaxially, though the biaxial stretching is preferable. In the case of biaxial stretching, any of simultaneous biaxial stretching, sequential stretching or multistage stretching (for instance, a combination of the simultaneous biaxial stretching and the sequential stretching) can be used, though simultaneous biaxial stretching is preferable. When biaxial stretching is used, the amount of magnification need not be the same in each stretching direction.

The stretching magnification can be, for example, 2 fold or more, preferably 3 to 30 fold in the case of monoaxial stretching. In the case of biaxial stretching, the stretching magnification can be, for example, 3 fold or more in any direction, namely 9 fold or more, such as 16 fold or more, e.g. 25 fold or more, in area magnification. An example for this stretching step would include stretching from about 9 fold to about 49 fold in area magnification. Again, the amount of stretch in either direction need not be the same.

While not required, the stretching can be conducted while exposing the extrudate to a temperature in the range of from about the Tcd temperature Tm.

Tcd and Tm are defined as the crystal dispersion temperature and melting point of the polyethylene having the lowest melting point among the polyethylenes used to produce the extrudate. The crystal dispersion temperature is determined by measuring the temperature characteristics of dynamic viscoelasticity according to ASTM D 4065. In one or more embodiments where Tcd is in the range of about 90° C. to 100° C., the stretching temperature can be from about 90° C. to 125° C.; e.g., from about 100° C. to 125° C., such as from 105° C. to 125° C.

In one or more embodiments, the stretched extrudate undergoes an optional thermal treatment before diluent removal. In the thermal treatment, the stretched extrudate is exposed to a temperature that is higher (warmer) than the temperature to which the extrudate is exposed during stretching. The planar dimensions of the stretched extrudate (length in MD and width in TD) can be held constant while the stretched extrudate is exposed to the higher temperature. Since the extrudate contains polymer and diluent, its length and width are referred to as the "wet" length and "wet" width. In one or more embodiments, the stretched extrudate is exposed to a temperature in the range of 120° C. to 125° C. for a time sufficient to thermally treat the extrudate, e.g., a time in the range of 1 second to 100 seconds while the wet length and wet width are held constant, e.g., by using tenter clips to hold the stretched extrudate along its perimeter. In other words, during the thermal treatment, there is no magnification or demagnification (i.e., no dimensional change) of the stretched extrudate in MD or TD.

In this step and in other steps such as dry orientation and heat setting where the sample (e.g., the extrudate, dried extrudate, membrane, etc.) is exposed to an elevated temperature, this exposure can be accomplished by heating air and then conveying the heated air into proximity with the sample. The temperature of the heated air, which is generally controlled at a set point equal to the desired temperature, is then conducted toward the sample through a plenum for example. Other methods for exposing the sample to an elevated temperature, including conventional methods such as exposing the sample to a heated surface, infra-red heating in an oven, etc. can be used with or instead heated air.

Diluent Removal

In one or more embodiments, at least a portion of the diluent is removed (or displaced) from the stretched extrudate to form a dried membrane. A displacing (or "washing") solvent can be used to remove (wash away, or displace) the diluent, as described in PCT Publication No. WO 2008/016174, for example.

In one or more embodiments, at least a portion of any remaining volatile species (e.g., washing solvent) is removed from the dried membrane after diluent removal. Any method capable of removing the washing solvent can be used, including conventional methods such as heat-drying, wind-drying (moving air), etc. Process conditions for removing volatile species such as washing solvent can be the same as those disclosed in PCT Publication No. WO 2008/016174, for example.

Stretching the Membrane (Dry Orientation)

Optionally, the membrane is stretched in at least one planar direction after diluent removal. For example, the membrane can be stretched (called "dry stretching" since at least a portion of the diluent has been removed or displaced) in at least MD. A dried membrane that has been dry stretched is called an "oriented" membrane. Before dry stretching, the dried membrane has an initial size in MD (a first dry length) and an initial size in TD (a first dry width). As used herein, the term "first dry width" refers to the size of the dried membrane in the transverse direction prior to the start of dry orientation. The term "first dry length" refers to the size of the dried membrane in the machine direction prior to the start of dry orientation. Tenter stretching equipment of the kind described in WO 2008/016174 can be used, for example.

The dried membrane can be stretched in MD from the first dry length to a second dry length that is larger than the first dry length by a magnification factor (the "MD dry stretching magnification factor") in the range of from about 1.1 to about 1.5. When TD dry stretching is used, the dried membrane can be stretched in TD from the first dry width to a second dry width that is larger than the first dry width by a magnification factor (the "TD dry stretching magnification factor"). Optionally, the TD dry stretching magnification factor is≤the MD dry stretching magnification factor. The TD dry stretching magnification factor can be in the range of from about 1.1 to about 1.3. The dry stretching (also called re-stretching since the diluent-containing extrudate has already been stretched) can be sequential or simultaneous in MD and TD. Since TD heat shrinkage generally has a greater effect on battery properties than does MD heat shrinkage, the amount of TD magnification generally does not exceed the amount of MD magnification. When TD dry stretching is used, the dry stretching can be simultaneous in MD and TD or sequential. When the dry stretching is sequential, generally MD stretching is conducted first followed by TD stretching.

The dry stretching can be conducted while exposing the dried membrane to a temperature ≤Tm, e.g., in the range of from about Tcd −30° C. to Tm. Tm is the melting peak of the polymer having the lowest melting peak among the polymers used to produce the microporous membrane. In one or more embodiments, the stretching temperature is conducted with the membrane exposed to a temperature in the range of from about 70 to about 135° C., for example from about 80° C. to about 132° C. In one or more embodiments, the MD stretching is conducted before TD stretching, and (i) the MD stretching is conducted while the membrane is exposed to a first temperature in the range of Tcd −30° C. to about Tm −10° C., for example 70 to about 125° C., or about 80° C. to about 120° C. and (ii) the TD stretching is conducted while the membrane is exposed to a second temperature that is higher than the first temperature but lower than Tm, for example about 70° C. to about 135° C., or about 127° C. to about 132° C., or about 129° C. to about 131° C.

In one or more embodiments, the MD stretching magnification is in the range of from about 1.1 to about 1.5, such as 1.2 to 1.4; the TD dry stretching magnification is in the range of from about 1.1 to about 1.3, such as 1.15 to 1.25; the MD dry stretching is conducted before the TD dry stretching, the MD dry stretching is conducted while the membrane is exposed to a temperature in the range of 80° C. to about 120° C., and the TD dry stretching is conducted while the membrane is exposed to a temperature in the range of 129° C. to about 131° C.

The stretching rate is preferably 3%/second or more in the stretching direction (MD or TD), and the rate can be independently selected for MD and TD stretching. The stretching rate is preferably 5%/second or more, more preferably 10%/second or more, e.g., in the range of 5%/second to 25%/second. Though not particularly critical, the upper limit of the stretching rate is preferably 50%/second to prevent rupture of the membrane.

Controlled Reduction of the Membrane's Width After Dry Stretching

Optionally, the membrane is subjected to a controlled reduction in width from the second dry width to a third width, the third dry width being in the range of from the first dry width to about 1.1 times larger than the first dry width. The width reduction is optionally conducted while the membrane is exposed to a temperature ≥Tcd −30° C., but no greater than Tm. For example, during width reduction the membrane can be exposed to a temperature in the range of from about 70° C. to about 135° C., such as from about 127° C. to about 132° C., e.g., from about 129° C. to about 131° C. In one or more embodiments, the decreasing of the membrane's width is conducted while the membrane is exposed to a temperature that is lower than Tm. In one or more embodiments, the third dry width is in the range of from 1.0 times larger than the first dry width to about 1.1 times larger than the first dry width.

It is believed that exposing the membrane to a temperature during the controlled width reduction that is the ≤temperature to which the membrane was exposed during the TD stretching leads to greater resistance to heat shrinkage in the finished membrane.

Optional Heat Set

Optionally, the membrane is thermally treated (heat-set) at least once following diluent removal, e.g., after dry stretching, the controlled width reduction, or both. It is believed that heat-setting stabilizes crystals and makes uniform lamellas in the membrane. In one or more embodiments, the heat setting is conducted while exposing the membrane to a temperature in the range Tcd to Tm, e.g., a temperature e.g., in the range of from about 100° C. to about 135° C., such as from about 127° C. to about 132° C., or from about 129° C. to about 131° C. Generally, the heat setting is conducted for a time sufficient to form uniform lamellas in the membrane, e.g., a time in the range of 1 to 100 seconds. In one or more embodiments, the heat setting is operated under conventional heat-set "thermal fixation" conditions. The term "thermal fixation" refers to heat-setting carried out while maintaining the length and width of the membrane substantially constant, e.g., by holding the membrane's perimeter with tenter clips during the heat setting.

Optionally, an annealing treatment can be conducted after the heat-set step. The annealing is a heat treatment with no load applied to the membrane, and can be conducted by using, e.g., a heating chamber with a belt conveyer or an air-floating-type heating chamber. The annealing may also be conducted continuously after the heat-setting with the tenter slackened. During annealing the membrane can be exposed to a temperature in the range of Tm or lower, e.g., in the range from about 60° C. to about Tm −5° C. Annealing is believed to provide the microporous membrane with improved permeability and strength.

Optional heated roller, hot solvent, cross linking, hydrophilizing, and coating treatments can be conducted if desired, e.g., as described in PCT Publication No. WO 2008/016174.

While the invention has been described in terms of a monolayer membrane, it is not limited thereto. The invention is compatible with multilayer membranes such as those disclosed in WO2008/016174. Such multilayer membranes can have layers comprising polyolefin, such as polyethylene and/or polypropylene. The polyolefin can be the same as those described herein for the monolayer membrane. Although the microporous membrane is described in terms of a "wet" process (e.g., the microporous membrane is produced from a mixture of polymer and diluent), the invention is not limited thereto, and the following description is not meant to foreclose other microporous membranes within the broader scope of the invention, such as membranes made in a "dry" process using little or no diluent.

Structure and Properties of the Microporous Membrane

In one or more embodiments, the microporous membrane comprises the paraxylylene polymer produced on or laminated with the microporous membrane. The thickness of the microporous membrane is generally in the range of from about 1.0 µm to about $1.0 \times 10^2$ µm, e.g., from about 5.0 µm to about 30.0 µm. The thickness of the microporous membrane can be measured by a contact thickness meter at 1 cm longitudinal intervals over the width of 20 cm, and then averaged to yield the membrane thickness. Thickness meters such as the Litematic available from Mitsutoyo Corporation are suitable. Non-contact thickness measurements are also suitable, e.g., optical thickness measurement methods.

In an embodiment, the invention relates to a microporous membrane, comprising:

(i) a microporous membrane comprising (a) a first polyethylene in an amount in the range of 60.0 wt. % to 99.0 wt. %, and having an Mw in the range of $1.2 \times 10^6$ to $3.0 \times 10^6$ and an MWD in the range of 4.5 to 10.0

(b) a second polyethylene in an amount in the range of 1.0 wt. % to 40.0 wt. % and having an Mw in the range of $1.0 \times 10^5$ to $9.0 \times 10^5$ and an MWD in the range of from 3.0 to 20.0, the weight percents being based on the weight of the membrane;

(ii) at least one paraxylylene polymer or copolymer, particularly a paraxylylene polymer or copolymer selected from the polymers or copolymers below:

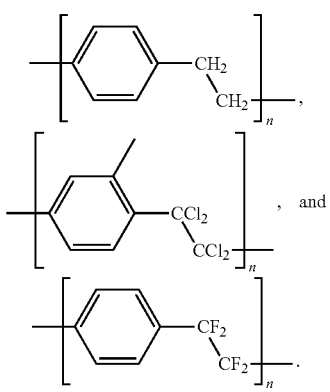

Optionally, the microporous membrane has one or more of the following properties.

Normalized Air Permeability ≤ 1.0×10³ sec/100 cm³/20 μm

In one or more embodiments, the microporous membrane's normalized air permeability (Gurley value, measured according to JIS P8117 and normalized to that of an equivalent microporous membrane having a thickness of 20 μm) is ≤1.0×10³ seconds/100 cm³/20 μm, e.g., in the range of about 20 seconds/100 cm³/20 μm to about 800 seconds/100 cm³/20 μm. Since the air permeability value is normalized to that of an equivalent film having a thickness of 20 μm, the microporous membrane's normalized air permeability value is expressed in units of "seconds/100 cm³/20 μm".

Normalized air permeability is measured according to JIS P8117, and the results are normalized to the permeability value of an equivalent film having a thickness of 20 μm using the equation $A = 20\ \mu m * (X)/T_1$, where X is the measured air permeability of a film having an actual thickness $T_1$ and A is the normalized air permeability of an equivalent film having a thickness of 20 μm.

In an embodiment, the microporous membrane's normalized air permeability is ≤ (i.e. the same or more permeable than) the microporous membrane substrate's normalized air permeability. Optionally, the microporous membrane's normalized air permeability is in the range of 0.15 to 0.90 times the microporous membrane substrate's air permeability.

Porosity

In one or more embodiments, the microporous membrane has a porosity ≥25%, e.g., in the range of about 25% to about 80%, or 30% to 60%. The microporous membrane's porosity is measured conventionally by comparing the film's actual weight to the weight of an equivalent non-porous film of the same composition (equivalent in the sense of having the same length, width, and thickness). Porosity is then determined using the formula: Porosity % = 100×(w2−w1)/w2, wherein "w1" is the actual weight of the microporous membrane and "w2" is the weight of the equivalent non-porous film having the same size and thickness.

Normalized Pin Puncture Strength

In one or more embodiments, the microporous membrane has a normalized pin puncture strength ≥1.0×10³ mN/20 μm, e.g., in the range of 1.1×10³ mN/20 μm to 1.0×10⁵ mN/20 μm, particularly in the range of 3500 mN/20 μm to 7000 mN/20 μm. Pin puncture strength is defined as the maximum load measured at a temperature of 23° C. when a microporous membrane having a thickness of $T_1$ is pricked with a needle of 1 mm in diameter with a spherical end surface (radius R of curvature: 0.5 mm) at a speed of 2 mm/second. The pin puncture strength ("S") is normalized to the pin puncture strength of an equivalent film having a thickness of 20 μm using the equation $S_2 = 20\ \mu m * (S_1)/T_1$, where $S_1$ is the measured pin puncture strength, $S_2$ is the normalized pin puncture strength, and $T_1$ is the average thickness of the microporous membrane.

Tensile Strength

In one or more embodiments, the microporous membrane has an MD tensile strength ≥95,000 kPa, e.g., in the range of 95,000 to 110,000 kPa, and a TD tensile strength ≥90,000 kPa, e.g., in the range of 90,000 kPa to 110,000 kPa. Tensile strength is measured in MD and TD according to ASTM D-882A.

Tensile Elongation

Tensile elongation is measured according to ASTM D-882A. In one or more embodiments, the microporous membrane's MD and TD tensile elongation are each >100%, e.g., in the range of 125% to 350%. In another embodiment, the microporous membrane's MD tensile elongation is in the range of, e.g., 125% to 250% and TD tensile elongation is in the range of, e.g., 140% to 300%.

Shutdown Temperature

The microporous membrane's shutdown temperature is measured by the method disclosed in PCT publication WO2007/052663. According to this method, the microporous membrane is exposed to an increasing temperature (5° C./minute) while measuring the membrane's air permeability. The microporous membrane's shutdown temperature is defined as the temperature at which the microporous membrane's air permeability (Gurley Value) is 100,000 secs./100 cm³. The microporous membrane's air permeability is measured according to JIS P8117 using an air permeability meter (EGO-1T available from Asahi Seiko Co., Ltd.). In an embodiment, the membrane has a shutdown temperature ≤140° C., e.g., in the range of about 132° C. to about 138° C. Optical examination of some films show that some films of the invention remain translucent at temperatures above 140° C., thus it is believed that some membranes may have a shutdown temperature >145.0° C., e.g., in the range of 150° C. to 250.0° C., e.g., in the range of from 170° C. to 230° C.

MD and TD Free Heat Shrinkage at 130° C.

In one or more embodiments, the microporous membrane has MD and TD heat shrinkages at 130° C. ≤55%, for example from 10 to about 35%. The microporous membrane's shrinkage in orthogonal planar directions (e.g., MD or TD) at 105° C. is measured as follows:

(i) Measure the size of a test piece of microporous membrane at ambient temperature in both MD and TD, (ii) expose the test piece to a temperature of 130° C. for 30 minutes with no applied load, and then (iii) measure the size of the microporous membrane at the smallest dimension in both MD and TD. The heat (or "thermal") shrinkage in either the MD or TD can be obtained by dividing the result of measurement (i) by the result of measurement (ii) and expressing the resulting quotient as a percent.

TD Heat Shrinkage at 150° C., Fixed MD

In an embodiment, the membrane has a TD heat shrinkage measured at 150° C. ≤35%, e.g., 10% to 25%. A relatively low heat shrink value can be of particular significance since it simulates the behavior of the membrane under conventional meltdown conditions, or above the operating temperature range of a lithium ion secondary battery such as those experienced during charging and discharging.

The measurement is slightly different from the measurement of heat shrinkage at 105° C., reflecting the fact that the edges of the membrane parallel to the membrane's TD are generally fixed within the battery, with a limited degree of freedom allowed for expansion or contraction (shrinkage) in TD, particularly near the center of the edges parallel to the membrane's MD. Accordingly, a square sample of microporous film measuring 50 mm along TD and 50 mm along MD is mounted in a frame, with the edges parallel to TD fixed to the frame (e.g., by tape) leaving a clear aperture of 35 mm in MD and 50 mm in TD. The frame with sample attached is then heated in thermal equilibrium (e.g., in an oven) at a temperature of 130° C. for thirty minutes, and then cooled. TD heat shrinkage generally causes the edges of the film parallel to MD to bow slightly inward (toward the center of the frame's aperture). The shrinkage in TD (expressed as a percent) is equal to the length of the sample in TD before heating divided by the narrowest length (within the frame) of the sample in TD after heating times 100 percent.

Meltdown Temperature

The microporous membrane optionally has a meltdown temperature $\geq 145.0°$ C., such as $\geq 150°$ C. Meltdown temperature can be measured as follows. A sample of the microporous membrane measuring 5 cm×5 cm is fastened along its perimeter by sandwiching the sample between metallic blocks each having a circular opening of 12 mm in diameter. The blocks are then positioned so the plane of the membrane is horizontal. A tungsten carbide ball of 10 mm in diameter is placed on the microporous membrane in the circular opening of the upper block. Starting at 30° C., the membrane is then exposed to an increasing temperature at rate of 5° C./minute. The temperature at which the microporous membrane is ruptured by the ball is defined as the membrane's meltdown temperature. Some films of the invention have a meltdown ranging from 230° C. to 300° C. Generally, this method cannot measure meltdown temperature in excess of 300° C.

Some films of the invention do not experience meltdown below the limits of this test, presumably due to the chemical nature of the paraxylylene polymer or copolymer. Thus, some films of the present invention are believed to have a meltdown temperature ranging from 230° C. to 800° C., particularly 275° C. to 400° C.

Embodiments of the microporous membranes described herein have well-balanced air permeability and liquid permeability (aqueous and non-aqueous) at atmospheric pressure, as well as improved puncture strength and increased meltdown and/or shutdown, that has not previously been achieved in polyolefin-containing microporous membrane. Thus, the microporous membrane can be used as a battery separator, filtration membrane, etc. The microporous membrane is particularly useful as a BSF for a secondary battery, such as a nickel-hydrogen battery, nickel-cadmium battery, nickel-zinc battery, silver-zinc battery, lithium-ion battery, lithium-ion polymer battery, etc. In an embodiment, the invention relates to lithium-ion secondary batteries containing BSF comprising the microporous membrane.

Such batteries are described in PCT Publication WO 2008/016174.

This invention will be described in more detail with reference to Examples below without intention of restricting the scope of this invention.

EXAMPLES

Comparative Example 1 (Control)

A polyolefin microporous substrate comprising 2 wt. % of a polyethylene resin having an Mw of $1.95 \times 10^6$ and an MWD of 5.09 and 98.0 wt. % HDPE having an Mw of $5.6 \times 10^5$ and an MWD of 4.1, commercially available as F20BMU grade battery separator film from Tonen Chemical Company has a nominal thickness of 20 µm, a basis weight of 11.6 g/m$^2$, a permeability of 123.3 sec/50 cm$^3$ and a puncture strength of 469 gf.

Example 1

The separator of comparative example 1 is exposed to chemical vapor deposition conditions as described in U.S. Pat. No. 5,538,758 to form coating of Parylene C having a mean thickness of a 82.8 nm thereon. The separator has a permeability of 650 sec/100 cm$^3$.

Examples 2-18

Example 1 was substantially repeated except that the type and amount of paraxylylene deposited on the F20BMU substrate membrane was altered as reported in Table 2.

TABLE 2

Selected Properties of Paraxylylene polymer-containing membranes

| Example | Substrate Membrane | Paraxylylene Polymer | Adhesion promoter | Nominal Thickness (µm) | Coating "Thickness", (nm) | Puncture, (gf) | Normalized Puncture (mN/20 µm) | Gurley Sec/100 cc | TD Shrink, 150° C., fixed MD (%) | SDT (° C.) | MDT (° C.) |
|---|---|---|---|---|---|---|---|---|---|---|---|
| CE1 | F20BMU | — | — | 20 | 0 | 469 | 4599 | 240 | break | 136 | 150 |
| 1 | F20BMU | Parylene C | N | 20 | 82.83 | — | — | 650 | | | |
| 2 | F20BMU | Parylene C | N | 20 | 56.92 | 576 | 5649 | 385 | | | |
| 3 | F20BMU | Parylene C | N | 20 | 33.26 | — | — | 240 | | | |
| 4 | F20BMU | Parylene C | Y | 20 | 92.97 | 578 | 5668 | 2085 | | | |
| 5 | F20BMU | Parylene C | Y | 20 | 62.32 | — | — | 617 | 32.8 | | 149 |
| 6 | F20BMU | Parylene C | Y | 20 | 30.86 | 581 | 5698 | 310 | break | 136 | 147 |
| 7 | F20BMU | Parylene HT | N | 20 | 78.22 | 640 | 6276 | 4706 | | | |
| 8 | F20BMU | Parylene HT | N | 20 | 53.55 | — | — | 2286 | | | |
| 9 | F20BMU | Parylene HT | N | 20 | 30.68 | 611 | 5992 | 554 | 23 | | >300 †† |
| 10 | F20BMU | Parylene HT | Y | 20 | 130.08 | — | — | ** | | | |
| 11 | F20BMU | Parylene HT | Y | 20 | 52.41 | — | — | 1707 | 18 | | >300 †† |
| 12 | F20BMU | Parylene HT | Y | 20 | 31.03 | 609 | 5972 | 464 | 26.8 | 138 | >300 †† |
| 13 | F20BMU | Parylene N | N | 20 | 71.71 | | | 1772 | | | |
| 14 | F20BMU | Parylene N | N | 20 | 59.14 | | | 852 | 21.6 | | 191 |
| 15 | F20BMU | Parylene N | N | 20 | 27.52 | 525 | 5148 | 388 | | | |
| 16 | F20BMU | Parylene N | Y | 20 | 74.825 | 526 | 5158 | 3425 | | | |

TABLE 2-continued

Selected Properties of Paraxylylene polymer-containing membranes

| Example | Substrate Membrane | Paraxylylene Polymer | Adhesion promoter | Nominal Thickness (μm) | Coating "Thickness", (nm) | Puncture, (gf) | Normalized Puncture (mN/20 μm) | Gurley Sec/100 cc | TD Shrink, 150° C., fixed MD (%) | SDT (° C.) | MDT (° C.) |
|---|---|---|---|---|---|---|---|---|---|---|---|
| 17 | F20BMU | Parylene N | Y | 20 | 50.9 | | | 509 | 27.2 | | 150 |
| 18 | F20BMU | Parylene N | Y | 20 | 23.465 | 532 | 5217 | 451 | 32 | 136 | 147 |

** not permeable, Gurley Precision Instruments model 4110 using Automatic Digital Timer modal 4320, Goniometer made by Rame-hart, Inc.
†† actual MDT exceeds equipment limitations Comparative Example 2

A polyolefin microporous substrate comprising 18 wt. % of a polyethylene resin having an Mw of $1.95 \times 10^6$ and an MWD of 5.09 and 82.0 wt. % HDPE having an Mw of $7.5 \times 10^5$ and an MWD of 11.9, commercially available as E16MMS grade battery separator film from Tonen Chemical Company, having a nominal thickness 16 μm, a basis weight of 10.3 g/m², a permeability of 420 sec/100 cm³, a porosity of 35.0%, a puncture strength of 375 mN/16 μm, 105° C. MD/TD Shrink and a 105° C. of 5.9/4.0 (available as E16MMS from Tonen Chemical Company).

Comparative Example 3

A polyolefin microporous substrate comprising 18 wt. % of a polyethylene resin having an Mw of $1.95 \times 10^6$ and an MWD of 5.09 and 82.0 wt. % HDPE having an Mw of $5.6 \times 10^5$ and an MWD of 4.1, commercially available as F16BME grade battery separator film from Tonen Chemical Company, having a nominal thickness 16 μm, a basis weight of 10.1 g/m², a permeability of 420 sec/100 cm³, a porosity of 35.0%, a puncture strength of 375 mN/16 μm, 105° C. MD/TD Shrink and a 105° C. of 5.9/4.0 (available as E16MMS from Tonen Chemical Company).

Examples 19-30

In Examples 19-31, the effect of the substrate selection on a membrane having Parylene N formed thereon is studied.

Examples 31-41

In Examples 19-31, the effect of the substrate selection on a membrane having Parylene C formed thereon is studied.

Examples 42-54

In Examples 42-54, the effect of the substrate selection on a membrane having Parylene HT formed thereon is studied.

TABLE 3

Selected Properties of Paraxylylene polymer-containing membranes

| Example | Substrate Membrane | Paraxylylene Polymer | Nominal Thickness (μm) | Coating "Thickness", (nm) | Puncture, (gf) | Normalized Puncture (mN/20 μm) | Free Shrink, % 130° C., 0.5 hr | Gurley Sec/100 cc |
|---|---|---|---|---|---|---|---|---|
| CE2 | E16MMS | — | 16 | 0 | 380 | 3726.508 | 74 | 440 |
| CE3 | F16BME | — | 16 | 0 | 350 | 3432 | 76 | 280 |
| CE1 | F20BMU | — | 20 | 0 | 469 | 4599 | 64 | 240 |
| 19 | E16MMS | Parylene N | 16 | 24.79 | 414 | 4060 | 54 | 730 |
| 20 | F16BME | Parylene N | 16 | 24.79 | 386 | 3785 | 35.5 | |
| 21 | F20BMU | Parylene N | 20 | 24.79 | 521 | 5109 | 33 | 281 |
| 22 | E16MMS | Parylene N | 16 | 30.8 | — | — | | |
| 23 | F16BME | Parylene N | 16 | 30.8 | — | — | | 439 |
| 24 | F20BMU | Parylene N | 20 | 30.8 | — | — | | 309 |
| 25 | E16MMS | Parylene N | 16 | 41.34 | — | — | 29 | 853 |
| 26 | F16BME | Parylene N | 16 | 41.34 | 393 | 3854 | 17.5 | 591 |
| 27 | F20BMU | Parylene N | 20 | 41.34 | 541 | 5305 | 15.7 | 362 |
| 28 | E16MMS | Parylene N | 16 | 50.6 | — | — | | 1828 |
| 29 | F16BME | Parylene N | 16 | 50.6 | — | — | | 1077 |
| 30 | F20BMU | Parylene N | 20 | 50.6 | — | — | | |
| 31 | E16MMS | Parylene C | 16 | 21.72 | 460 | 4511 | 54.5 | 549 |
| 32 | F16BME | Parylene C | 16 | 21.72 | 418 | 4099 | 40.8 | 337 |
| 33 | F20BMU | Parylene C | 20 | 21.72 | 575 | 5639 | 32.2 | 254 |
| 34 | E16MMS | Parylene C | 16 | 25.07 | — | — | | 557 |
| 35 | F16BME | Parylene C | 16 | 25.07 | — | — | | 345 |
| 36 | F20BMU | Parylene C | 20 | 25.07 | — | — | | 285 |
| 37 | E16MMS | Parylene C | 16 | 44.41 | — | — | 23.3 | 805 |
| 38 | F16BME | Parylene C | 16 | 44.41 | 430 | 4217 | 20.5 | 464 |
| 39 | F20BMU | Parylene C | 20 | 44.41 | 561 | 5501 | 16.7 | 307 |
| 40 | E16MMS | Parylene C | 16 | 60.95 | — | — | | 1381 |
| 41 | F16BME | Parylene C | 16 | 60.95 | — | — | | 803 |
| 42 | F20BMU | Parylene C | 20 | 60.95 | — | — | | |
| 43 | E16MMS | Parylene HT | 16 | 24.96 | 471 | 4619 | 43.5 | 720 |
| 44 | F16BME | Parylene HT | 16 | 24.96 | 430 | 4217 | 30.8 | 421 |
| 45 | F20BMU | Parylene HT | 20 | 24.96 | 584 | 57279 | 25 | 294 |
| 46 | E16MMS | Parylene HT | 16 | 27.9 | — | — | | 821 |
| 47 | F16BME | Parylene HT | 16 | 27.9 | — | — | | 457 |
| 48 | F20BMU | Parylene HT | 20 | 27.9 | — | — | | 325 |

TABLE 3-continued

Selected Properties of Paraxylylene polymer-containing membranes

| Example | Substrate Membrane | Paraxylylene Polymer | Nominal Thickness (μm) | Coating "Thickness", (nm) | Puncture, (gf) | Normalized Puncture (mN/20 μm) | Free Shrink, % 130° C., 0.5 hr | Gurley Sec/100 cc |
|---|---|---|---|---|---|---|---|---|
| 49 | E16MMS | Parylene HT | 16 | 44.48 | — | — | 13.7 | |
| 50 | F16BME | Parylene HT | 16 | 44.48 | — | — | 10 | |
| 51 | F20BMU | Parylene HT | 20 | 44.48 | — | — | 7.8 | |
| 52 | E16MMS | Parylene HT | 16 | 120.63 | — | — | | 2424 |
| 53 | F16BME | Parylene HT | 16 | 120.63 | — | — | | 1038 |
| 54 | F20BMU | Parylene HT | 20 | 120.63 | 574 | 5629 | | 518 |

Figure 2:
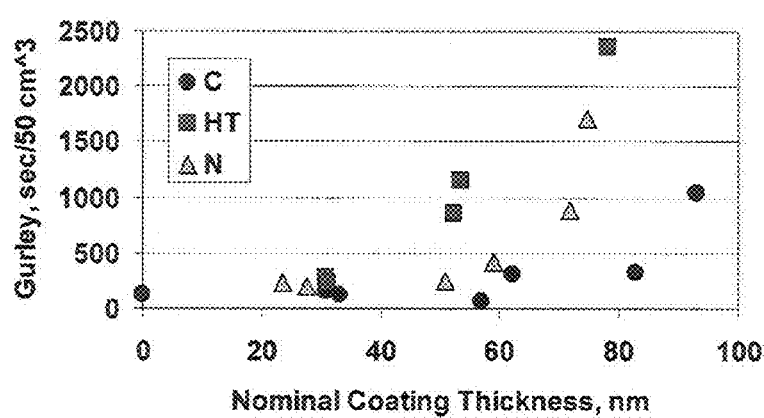
FIG. 2 illustrates the effect of coating weight on permeability for particular membranes of the invention.

FIG. 2 shows the effect of including the paraxylylene polymer on the permeability of the polyolefin membrane of Comparative Example 1. As FIG. 2 shows, puncture strength of the paraxylylene containing examples show an improvement in puncture strength of 12-30% compared to the puncture strength of the polyolefin membrane alone. The improvement in puncture strength is surprisingly large in view of the relatively small amount of paraxylylene polymer that is incorporated into the membrane (typically 0.2 to 1.3% of the total film thickness).

Figure 3:
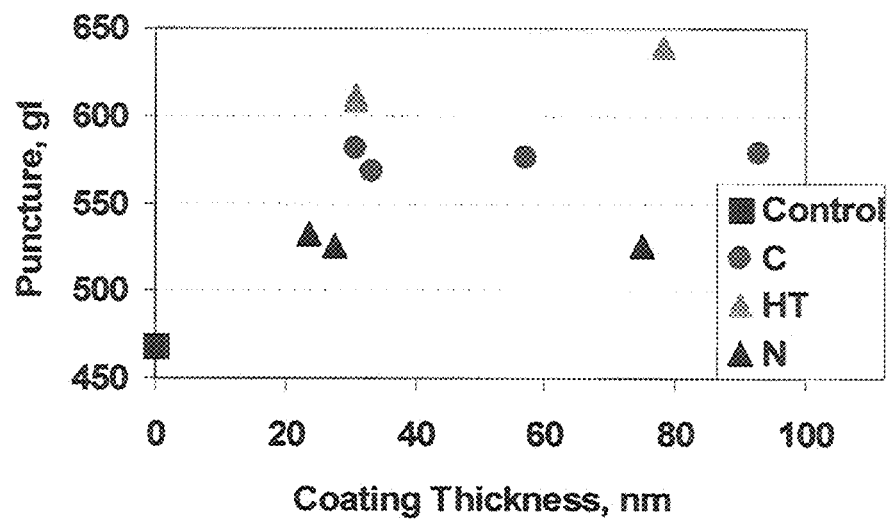
FIG. 3 illustrates the coating weight on the puncture strength for particular membranes of the invention.

FIG. 3 shows the effect of including the paraxylylene polymer on the puncture strength of the polyolefin membrane Comparative Example 1. Puncture strength of the paraxylylene containing examples show an improvement in puncture strength of 12-30% compared to the puncture strength of the polyolefin membrane alone. The improvement in puncture strength is surprisingly large in view of the relatively small amount of paraxylylene polymer that is incorporated into the membrane (typically 0.2 to 1.3% of the total film thickness).

X-ray Photoelectron Spectroscopy (XPS) confirms that the membranes contain the desired paraxylylene polymer. For example, 0-1200 eV survey spectra for the N coating consist of peaks only from carbon (C1s and CKVV), and the C1s spectrum exhibits the π→π* satellite energy characteristic of aromatic rings, and the intensity is commensurate with the aromatic content—75%. This satellite is also readily visible in the C1s spectrum for examples including Parylene C. Signals associated with C1 and the ratio of C1/C is only slightly lower than that theoretically expected for Parylene C. Examples including Parylene HT show C1s and F1s signals, and the F/C atomic ratio is again only slightly lower than theoretically expected (0.5). The deviation from the theoretically expected results is attributable to a small contribution from the BSF polyethylene substrate.

Figure 4:
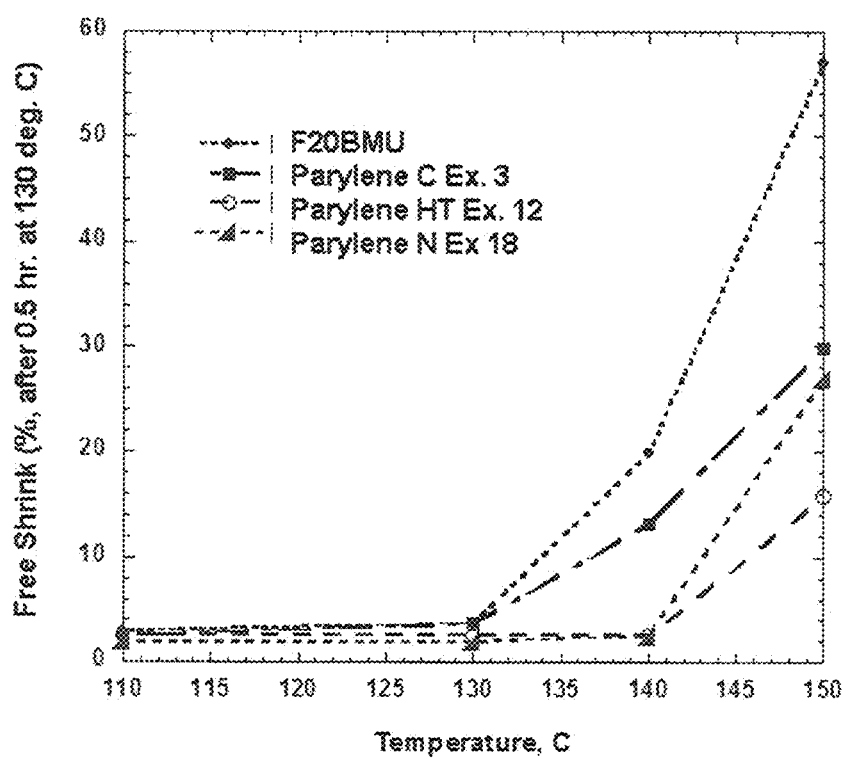
FIG. 4 illustrates the improvement in free shrinkage (0.5 hr at 130° C.) for particular membranes of the invention.

FIG. 4 illustrates the improvement in shrinkage for membranes including the paraxylylene polymer-containing membranes compared to the polyolefin membrane Comparative Example 1.

Various terms have been defined above. To the extent a term used in a claim is not defined above, it should be given the broadest definition persons in the pertinent art have given that term as reflected in at least one printed publication or issued patent.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside herein, including all features which would be treated as equivalents thereof by those skilled in the art to which this disclosure pertains.

When numerical lower limits and numerical upper limits are listed herein, ranges from any lower limit to any upper limit within the disclosed range are expressly contemplated.

What is claimed is:

1. A microporous membrane comprising about 0.05% to about 3% by weight of a paraxylylene polymer or copolymer based on the total weight of the microporous membrane.

2. The microporous membrane of claim 1, wherein the paraxylylene polymer or copolymer derived from a repeat unit of the formula:

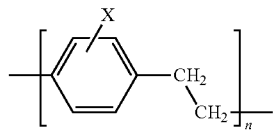

wherein n is an integer having a value of greater than or equal to 2 and X is a functional group selected from the group consisting of hydrogen, linear or branched substituted or unsubstituted $C_1$-$C_{10}$ alkyl; linear or branched, substituted or unsubstituted $C_1$-$C_{10}$ haloalkyl; substituted or unsubstituted $C_6$-$C_{20}$ aryl, $C_6$-$C_{20}$ haloaryl and perhaloaryl, linear or branched, substituted or unsubstituted $C_2$-$C_{10}$ alkenyl, and linear or branched substituted or unsubstituted $C_2$-$C_{10}$ haloalkenyl groups.

3. The microporous membrane of claim 2, wherein X is $CF_3$.

4. The microporous membrane of claim 2, wherein X is $CH_2CH_2(CF_2)_mCF_3$ and m ranges from 1 to 5.

5. The microporous membrane of claim 1, wherein the paraxylylene polymer or copolymer is derived from a repeat unit of the formula:

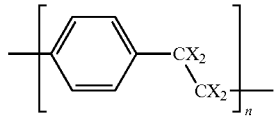

wherein n is an integer having a value of greater than or equal to 2 and each X is independently selected from hydrogen, chlorine and fluorine.

6. The microporous membrane of claim 1, wherein the paraxylylene polymer or copolymer is derived from a repeat unit of the formula:

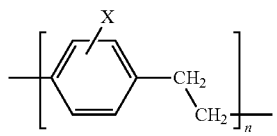

wherein n is an integer having a value of greater than or equal to 2 and X is a functional group selected from the group consisting of amino, cyano, $C_2$-$C_{10}$ carboxyl, $C_2$-$C_{10}$ alkoxy, and $C_2$-$C_{10}$ hydroxyalkyl groups, hydroxyl, nitro, or halide groups.

7. The microporous membrane of claim 6, wherein X is fluoride or chloride.

8. The microporous membrane of claim 1, wherein the paraxylylene polymer or copolymer is derived from a repeat unit of the formula:

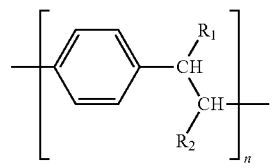

wherein n is an integer having a value of greater than or equal to 2 and $R_1$ and $R_2$ are each functional groups independently selected from the group consisting of hydrogen, hydroxyl, nitro. halide, linear or branched substituted or unsubstituted $C_1$-$C_{10}$ alkyl; linear or branched. substituted or unsubstituted $C_1$-$C_{10}$ haloaklyl; substituted or unsubstituted $C_6$-$C_{20}$ aryl, $C_6$-$C_{20}$ haloarly and perhaloraryl, linear or branched, substituted or unsubstituted $C_2$-$C_{10}$ alkenyl, and linear or branched substituted or unsubtituted $C_2$-$C_{10}$ haloalkenyl groups.

9. The microporous membrane of claim 8, wherein $R_1$ and $R_2$ are phenyl,

10. The microporous membrane of claim 8, wherein at least one of $R_1$ and $R_2$ is fluoride or chloride.

11. The microporous membrane of claim 1, further comprising a microporous polymeric membrane substrate.

12. The microporous membrane of claim 11, wherein the substrate comprises at least one of polyethylene or polypropylene.

13. The microporous membrane of claim 12, wherein the substrate comprises comprising from 1 wt. % to 20 wt. % of polyethylene having an Mw>$1.0\times10^6$, and 80 wt. % to 99 wt. % of polyethylene having an Mw≤$1.0\times10^6$, based on the weight of the substrate and the membrane has a shutdown temperature of >145° C.

14. The microporous membrane of claim 13, wherein the substrate further comprises 5 wt. % to 40 wt. % polypropylene having an Mw>$7.5\times10^5$, based on the weight of the substrate.

15. The microporous membrane claim of 1, wherein the concentration of the paraxylylene polymer or copolymer that varies in the thickness direction of the membrane.

16. The microporous membrane of claim 1, wherein the microporous membrane has a meltdown temperature ranging from 230° C. to 800° C.

17. The microporous membrane of claim 1, wherein the microporous membrane has one or more of the following properties: i) a normalized air permeability ≤600 sec/100 $cm^3$/20 μm; ii) a porosity in the range of from about 25% to about 80%; iii) a normalized pin puncture strength ≤3,000 mN/20 μm; iv) a tensile strength ≥40,000 kPa: v) an electrolytic solution absorption speed ≥2,0, vi) a TD heat shrinkage at 105° C.≤2.5%; and/or vii) a TD heat shrinkage at 130° C.≤15%.

18. A microporous membrane comprising a 0.1 to 5.0 wt. % paraxylylene polymer or copolymer and a 95.0 to 99.9 wt. % of a microporous polyolefin membrane substrate, based on the weight of the membrane, wherein the paraxylylene polymer or copolymer comprises fluorine and the microporous polyolefin substrate comprises 1 wt. % to 20 wt. % of polyethylene having an Mw >$1.0\times10^6$; and 80 wt. % to 99 wt. % of polyethylene having an Mw >$1.0\times10^6$, based on the weight of the substrate, the membrane having a shutdown temperature of >145° C. and an MD/TD shrink ratio measured at 130° C.>0.95 and a TD heat shrinkage at 130° C.≤2.5% and and MD heat shrinkage at 130° C.≤2.5.

19. A battery separator film comprising the microporous membrane of claim 1.

20. A method for producing a microporous membrane comprising combining at least a first paraxylylene polymer or copolymer and a microporous polymeric membrane substrate, wherein the microporous membrane comprises about 0.05% to about 3% by weight of the paraxylylene polymer or copolymer based on the total weight of the microporous membrane.

21. The method of claim 20, wherein the paraxylylene polymer or copolymer is formed on the microporous polymeric, substrate by vapor phase deposition.

22. The method of claim 20, wherein the paraqlylene polymer or copolymer is laminated to the microporous polymeric membrane substrate.

23. The microporous membrane product produced by the method of claim 20.

24. A battery comprising an anode, a cathode, an electrolyte, and a separator situated between the anode and the cathode, the separator comprising: a microporous polymeric membrane comprising about 0.05% to about 3% by weight of a paraxylylene polymer or copolymer based on the microporous polymeric membrane.

25. The battery of claim 24, wherein the wherein the paraxylylene polymer or copolymer comprises fluorine or chlorine.

* * * * *

UNITED STATES PATENT AND TRADEMARK OFFICE
CERTIFICATE OF CORRECTION

PATENT NO.         : 8,815,436 B2          Page 1 of 1
APPLICATION NO.    : 13/131302
DATED              : August 26, 2014
INVENTOR(S)        : Brant et al.

It is certified that error appears in the above-identified patent and that said Letters Patent is hereby corrected as shown below:

In the Claims

In Column 30

At line 24, please change "Mw > 1.0" to --Mw≤1.0--.

Signed and Sealed this
Twenty-first Day of April, 2015

Michelle K. Lee
*Director of the United States Patent and Trademark Office*